United States Patent
Kamio et al.

(10) Patent No.: US 12,545,816 B2
(45) Date of Patent: Feb. 10, 2026

(54) FUNCTIONAL LAYER WITH ADHESIVE LAYER, LAMINATE, AND USE THEREOF

(71) Applicants: MITSUI CHEMICALS, INC., Tokyo (JP); Hopnic Laboratory Co., Ltd., Sabae (JP)

(72) Inventors: Hiroyuki Kamio, Nagoya (JP); Yoshimitsu Aiiso, Sabae (JP); Hideki Imamura, Sabae (JP)

(73) Assignees: MITSUI CHEMICALS, INC., Tokyo (JP); HOPNIC LABORATORY CO., LTD., Sabae (JP)

( * ) Notice: Subject to any disclaimer, the term of this patent is extended or adjusted under 35 U.S.C. 154(b) by 1252 days.

(21) Appl. No.: 17/279,927

(22) PCT Filed: Sep. 26, 2019

(86) PCT No.: PCT/JP2019/037934
§ 371 (c)(1),
(2) Date: Mar. 25, 2021

(87) PCT Pub. No.: WO2020/067328
PCT Pub. Date: Apr. 2, 2020

(65) Prior Publication Data
US 2022/0112406 A1   Apr. 14, 2022

(30) Foreign Application Priority Data
Sep. 26, 2018  (JP) .................. 2018-180714

(51) Int. Cl.
| | | |
|---|---|---|
| C09J 7/38 | (2018.01) | |
| B32B 7/12 | (2006.01) | |
| B32B 27/36 | (2006.01) | |
| C09J 133/08 | (2006.01) | |
| C09J 153/00 | (2006.01) | |
| G02B 5/30 | (2006.01) | |

(52) U.S. Cl.
CPC .............. C09J 7/387 (2018.01); B32B 7/12 (2013.01); B32B 27/36 (2013.01); C09J 7/385 (2018.01); C09J 133/08 (2013.01); C09J 153/00 (2013.01); G02B 5/305 (2013.01); *B32B 2307/42* (2013.01); *B32B 2307/518* (2013.01); *B32B 2551/00* (2013.01)

(58) Field of Classification Search
None
See application file for complete search history.

(56) References Cited

U.S. PATENT DOCUMENTS

| | | | |
|---|---|---|---|
| 4,448,847 A * | 5/1984 | Bell ...................... | C08J 5/12 427/302 |
| 6,432,327 B2 | 8/2002 | Beeloo et al. | |
| 7,581,832 B2 | 9/2009 | Begon et al. | |
| 8,187,712 B2 | 5/2012 | Ryu et al. | |
| 9,382,461 B2 | 7/2016 | Boyce et al. | |
| 2001/0038438 A1 | 11/2001 | Beeloo et al. | |
| 2007/0195422 A1 | 8/2007 | Begon et al. | |
| 2008/0094702 A1 | 4/2008 | Mizuno | |
| 2009/0201584 A1 | 8/2009 | Ryu et al. | |
| 2013/0242393 A1* | 9/2013 | Ryu ..................... | G02B 5/3033 264/1.32 |
| 2015/0276986 A1 | 10/2015 | Ryu et al. | |
| 2017/0139230 A1 | 5/2017 | Ambler et al. | |
| 2019/0061226 A1 | 2/2019 | Kamio et al. | |

FOREIGN PATENT DOCUMENTS

| | | | |
|---|---|---|---|
| JP | H09258009 A | 10/1997 | |
| JP | 2003533719 A | 11/2003 | |
| JP | 2006339433 | * 12/2006 | ............... H05K 9/00 |
| JP | 2009527783 A | 7/2009 | |
| JP | 2011-145513 A | 7/2011 | |
| JP | 2014092580 A | 5/2014 | |
| JP | 2014202904 A | 10/2014 | |
| WO | 2006035494 A1 | 4/2006 | |
| WO | 2009098886 A1 | 8/2009 | |
| WO | 2017146201 A1 | 8/2017 | |
| WO | 2017/170516 A1 | 10/2017 | |

OTHER PUBLICATIONS

JP 2006339433 machine translation. (Year: 2006).*
International Search Report (PCT/ISA/210) with an English translation and Written Opinion (PCT/ISA/237) mailed on Nov. 5, 2019, by the Japan Patent Office as the International Searching Authority for International Application No. PCT/JP2019/037934.

* cited by examiner

*Primary Examiner* — Alicia Chevalier
*Assistant Examiner* — Thomas A Mangohig
(74) *Attorney, Agent, or Firm* — BUCHANAN INGERSOLL & ROONEY PC

(57) ABSTRACT

A functional layer with an adhesive layer of the present invention includes a functional layer and a curable adhesive layer AD2 arranged over at least a part of a surface of the functional layer, in which the curable adhesive layer AD2 satisfies all the following requirements (1) and (2):

(1) in a case where 32 g of a steel ball is placed on an adhesive surface of the curable adhesive layer AD2 at 25° C. and kept as it is for 10 seconds, and then a glass plate is slowly tilted, the steel ball starts to roll at an angle of 5° or less;

(2) after being cured at 90° C. for 2 hours, the curable adhesive layer AD2 satisfies a ratio (b/a) of a plastic deformation amount b to an elastic deformation amount a of 0.01 to 100 at 25° C. under a load of 0.1 mN.

20 Claims, No Drawings

FUNCTIONAL LAYER WITH ADHESIVE LAYER, LAMINATE, AND USE THEREOF

TECHNICAL FIELD

The present invention relates to a functional layer with an adhesive layer, a laminate, and use thereof.

BACKGROUND ART

Polarizing lenses can prevent the transmission of reflected light. Therefore, the polarizing lenses are used for protecting eyes by blocking out strong reflected light in outdoor environments such as ski resorts and fishing places, ensuring safety by blocking out reflected light from oncoming vehicles while driving a car, and the like.

Patent Document 1 discloses a plastic polarizing lens which is a polarizing lens including a plastic lens substrate and a polyvinyl alcohol-based polarizing film. The document describes a method of sticking the lens substrate and the polarizing film together by using an epoxy-based resin or the like.

Patent Document 2 discloses a method of sticking a preheated planar polarizing film to the convex surface of a lens substrate via a pressure-sensitive adhesive while pressing the polarizing film on the convex surface of the lens substrate with a pad. The document also discloses a polarizing lens obtained by the method. The document describes that the pressure-sensitive adhesive is selected from a polyacrylate-based compound and a styrene-based block copolymer.

Patent Document 3 discloses a lens including a first layer and a second layer that are bonded to each other with adhesive strength measured by a predetermined method.

Patent Document 4 discloses a plastic polarizing lens including a polarizing film made of polyethylene terephthalate on the surface of a plastic material. According to the document, the polarizing lens is manufactured by injection molding. However, the document does not disclose the technique for sticking the polarizing film to the plastic material.

Patent Document 5 discloses a plastic polarizing lens including a thiourethane-based resin layer on at least one surface of a polarizing film made of a thermoplastic polyester shaped under a predetermined temperature condition.

Patent Document 6 discloses a polarizing lens including a lens substrate on one surface of a thermoplastic resin film shaped without coming in contact with a molding apparatus.

RELATED DOCUMENT

Patent Document

[Patent Document 1] Japanese Unexamined Patent Publication No. H9-258009

[Patent Document 2] PCT Japanese Translation Patent Publication No. 2009-527783

[Patent Document 3] US Patent No. 2017/0139230

[Patent Document 4] PCT Japanese Translation Patent Publication No. 2003-533719

[Patent Document 5] International Publication No. WO2009/098886

[Patent Document 6] International Publication No. WO2017/146201

SUMMARY OF THE INVENTION

Technical Problem

In the conventional techniques described in Patent Documents 1 to 6, the adhesiveness between a functional layer such as a polarizing layer and a substrate needs to be improved. Particularly, at a site where the radius of curvature is small, the adhesiveness needs to be improved. Furthermore, the adhesiveness at the outer peripheral edge during annealing needs to be improved. As a result of the studies, the inventors of the present invention have found a new problem in that unprocessed residues are generated at the outer peripheral edge of a lens during the edging process (outer periphery processing) in the process of manufacturing a lens. Presumably, this problem may arise not only in a case where a lens is used as a substrate, but in a case where a functional layer such as a polarizing layer and a substrate are bonded to each other and the outer peripheral edge thereof is processed, particularly, in a case where some sites in a substrate have a small radius of curvature.

The unprocessed residues mean residues of a functional resin film such as a polarizing film that remain at the outer peripheral edge without being scraped off after a grinding and polishing (scraping) process which is the outer periphery processing for a lens. Presumably, because the functional resin film is more difficult to cut and scrape in the grinding and polishing (scraping) process compared to the lens substrate and the like, the unprocessed residues may be generated.

That is, a first object of the present invention is to provide a functional layer with an adhesive layer in which the functional layer exhibits excellent adhesiveness to a substrate and also exhibits excellent adhesiveness to a substrate at outer peripheral edge during annealing.

Furthermore, a second object of the present invention is to provide a laminate which includes a functional layer and a substrate exhibiting excellent adhesiveness to each other and also exhibiting excellent adhesiveness to each other at outer peripheral edge during annealing, and inhibits unprocessed residues from remaining at outer peripheral edge of a lens during outer periphery processing in a process of manufacturing the lens.

Solution to Problem

As a result of intensive studies, the inventors of the present invention have found that at least one of the above objects can be achieved in a case where a curable adhesive layer having specific performance is used. Based on the finding, the inventors have accomplished the present invention.

That is, the present invention can be described as below.

[1] A functional layer with an adhesive layer, including a functional layer; and a curable adhesive layer AD2 arranged over at least a part of a surface of the functional layer;

in which the curable adhesive layer AD2 satisfies both the following requirements (1) and (2).

(1) In a case where 32 g of a steel ball is placed on an adhesive surface of the curable adhesive layer AD2 at 25° C. and kept as it is for 10 seconds, and then a glass plate is slowly tilted, the steel ball starts to roll at an angle of 5° or less.

(2) After being cured at 90° C. for 2 hours, the curable adhesive layer AD2 satisfies a ratio (b/a) of a plastic deformation amount b to an elastic deformation amount a of 0.01 to 100 at 25° C. under a load of 0.1 mN.

[2] The functional layer with an adhesive layer described in [1], in which the curable adhesive layer AD2 satisfies the following requirement (3).

(3) After being cured at 90° C. for 2 hours, the curable adhesive layer AD2 has a dynamic hardness (DHT115-2) of 0.01 to 5,000 after removing the load of 0.1 mN at 25° C.

[3] The functional layer with an adhesive layer described in [1] or [2], in which the curable adhesive layer AD2 satisfies the following requirement (4).

(4) After being cured at 90° C. for 2 hours, the curable adhesive layer AD2 has a storage modulus of 0.5 MPa or higher and 1,000 MPa or lower at 25° C.

[4] The functional layer with an adhesive layer described in any one of [1] to [3], in which the plastic deformation amount b is greater than 0 and 1 or less.

[5] The functional layer with an adhesive layer described in any one of [1] to [4], in which the functional layer includes a polymer layer having a glass transition temperature and a softening point temperature of 0° C. or higher and a thickness in a range of 1 μm to 1 mm.

[6] The functional layer with an adhesive layer described in [5], in which the polymer layer has at least one property selected from a polarizing property, a specific wavelength absorbing property, a photochromic property, and a toning property.

[7] The functional layer with an adhesive layer described in any one of [1] to [6], in which the curable adhesive layer AD2 has a thickness less than 100 μm.

[8] The functional layer with an adhesive layer described in any one of [1] to [7], in which the curable adhesive layer AD2 contains at least one kind of curable polymer selected from the group consisting of an ester-based resin, an epoxy-based resin, a urethane-based resin, and a (meth)acrylic resin, and a curing accelerator.

[9] The functional layer with an adhesive layer described in any one of [1] to [8], in which the curable adhesive layer AD2 further satisfies the following requirement.

(5) After being cured, the curable adhesive layer AD2 has a refractive index (JIS K7142) of 1.45 or higher.

[10] The functional layer with an adhesive layer described in [5] or [6], in which the polymer layer is substantially a uniaxially stretched film.

[11] The functional layer with an adhesive layer described in [10], in which the polymer layer is a polarizing film containing polyethylene terephthalate.

[12] A substrate with a functional layer including, in the following order, a functional layer;
an adhesive layer AD2-1; and
a substrate;
in which the adhesive layer AD2-1 is disposed in at least a part of a space between a surface of the functional layer and a surface of the substrate that face each other and satisfies the following requirement (i).
(i) A ratio (b/a) of a plastic deformation amount b to an elastic deformation amount a is 0.01 to 100 at 25° C. under a load of 0.1 mN.

[13] The substrate with a functional layer described in [12], in which the adhesive layer AD2-1 satisfies the following requirement (ii).
(ii) A dynamic hardness (DHT115-2) is 0.01 to 5,000 after removing the load of 0.1 mN at 25° C.

[14] The substrate with a functional layer described in [12] or [13], in which the adhesive layer AD2-1 satisfies the following requirement (iii).
(iii) A storage modulus is 0.5 MPa or higher and 1,000 MPa or lower at 25° C.

[15] A laminate including, in the following order, a protective layer;
a functional layer;
an adhesive layer AD2-1; and
a substrate;
in which the adhesive layer AD2-1 is disposed at least in a part of a space between a surface of the functional layer and a surface of the substrate that face each other, the protective layer satisfies all the following requirements (a), (b), and (c), and the adhesive layer AD2-1 satisfies the following requirement (i).
(a) A thickness is 10 μm to 1 mm.
(b) A ratio (b/a) of a plastic deformation amount b to an elastic deformation amount a is 0.1 to 10 at 25° C. under a load of 0.1 mN.
(c) A dynamic hardness (DHT115-2) is 400 to 3,000 after removing a load of 0.1 mN at 25° C.
(i) A storage modulus is 0.5 MPa or higher and 1,000 MPa or lower at 25° C.

[16] The laminate described in [15], in which the protective layer satisfies the following requirement (d).
(d) A pencil hardness is HB to 9H.

[17] The laminate described in [15] or [16], further including an adhesive layer AD1-1 between the protective layer and the functional layer,
in which the adhesive layer AD1-1 satisfies the following requirement (i).
(i) A ratio (b/a) of a plastic deformation amount b to an elastic deformation amount a is 0.01 to 100 at 25° C. under a load of 0.1 mN.

[18] The laminate described in [17], in which the adhesive layer AD1-1 satisfies the following requirement (ii).
(ii) A dynamic hardness (DHT115-2) after removing the load of 0.1 mN at 25° C. is 0.01 to 5,000.

[19] The laminate described in [17] or [18], in which the adhesive layer AD1-1 satisfies the following requirement (iii).
(iii) A storage modulus is 0.5 MPa or higher and 1,000 MPa or lower at 25° C.

[20] An optical component including the substrate with a functional layer described in any one of [12] to [14] or the laminate described in any one of [15] to [19], in which the substrate is a lens having a refractive index of 1.49 or higher.

[21] The optical component described in [20], in which the adhesive layer AD2-1 is in contact with at least a part of a surface of the lens.

[22] The optical component described in [20] or [21], in which the lens contains one or more kinds of materials selected from the group consisting of a polycarbonate resin, a polyester resin, a polyester copolymer, a polyamide resin, a polyimide resin, a poly(meth)acrylate resin, a polyolefin resin, a polyurea urethane resin, a poly(thio)urethane resin, a polysulfide resin, a poly(thio)(meth)acrylate resin, an allyl diglycidyl carbonate resin, and inorganic glass.

[23] The optical component described in [22], in which the optical component is a polarizing lens in which the functional layer has a polarizing property.

In the present specification, for example, "1 to 10" means 1 or greater and 10 or less.

Advantageous Effects of Invention

According to the present invention, it is possible to provide a functional layer with an adhesive layer in which the functional layer exhibits excellent adhesiveness to a substrate and also exhibits excellent adhesiveness to a substrate at outer peripheral edge during annealing.

Furthermore, according to the present invention, it is possible to provide a laminate which includes a functional layer and a substrate exhibiting excellent adhesiveness to each other and also exhibiting excellent adhesiveness to each other at outer peripheral edge during annealing, and inhibits unprocessed residues from remaining at outer peripheral edge of a lens during outer periphery processing in a process of manufacturing the lens.

DESCRIPTION OF EMBODIMENTS

The functional layer with an adhesive layer, the substrate with a functional layer, and the laminate of the present invention will be described based on the embodiments.

<Functional Layer with Adhesive Layer>

The functional layer with an adhesive layer (functional film with an adhesive layer) of the present embodiment includes a functional layer and a curable adhesive layer AD2 arranged over at least a part of a surface of the functional layer.

[Functional Layer]

The functional layer is not particularly limited as long as it can be bonded to a substrate which will be described later. As the functional layer, layers made of various resins can be used. The functional layer includes a polymer layer having a glass transition temperature and a softening point which are preferably 0° C. or higher, more preferably 0° C. or higher and 200° C. or lower, and particularly preferably 0° C. or higher and 180° C. or lower, and having a thickness which is in a range of 1 μm to 1 mm, preferably in a range of 10 μm to 300 μm, and more preferably in a range of 20 μm to 200 μm.

In a case where the polymer layer has both the glass transition temperature and softening point, these are in the above temperature range. In a case where the polymer layer has the glass transition temperature or the softening point, either of these that the polymer layer has is in the above temperature range. In the present embodiment, in a case where the polymer layer has a plurality of glass transition temperatures, the lowest temperature is regarded as the glass transition temperature.

In a case where the functional layer includes such a polymer layer, by using the curable adhesive layer AD2, the adhesiveness between the functional layer and the substrate is improved.

The functional layer may be composed only of the polymer layer, or may have a laminated structure in which at least another layer is laminated over the polymer layer. The polymer layer may be a laminate of different layers.

Generally, the functional layer includes a polymer layer having at least one property selected from a polarizing property, a specific wavelength absorbing property, a photochromic property, and a toning property. However, the function of the polymer layer is not necessarily limited to these.

In order to impart the polarizing property to the functional layer, the polymer layer composing the functional layer may be formed of a polarizing film. As the polarizing film, a substantially uniaxially stretched film can be used. In the present embodiment, it is possible to address the problem of adhesiveness that arises particularly in a case where a stretched film having residual stress is used for the functional layer.

The polarizing film can be composed of a thermoplastic resin. The thermoplastic resin can be, for example, a single layer of thermoplastic polyester, thermoplastic polycarbonate, thermoplastic polyolefin, thermoplastic polyimide, thermoplastic polyamide, polyvinyl alcohol (PVA), triacetyl cellulose (TAC), or the like or a laminate of a plurality of layers of these resins. From the viewpoint of water resistance, heat resistance, and molding properties, thermoplastic polyester and thermoplastic polycarbonate are preferable. From the viewpoint of water resistance and weather fastness, thermoplastic polyester is more preferable.

Examples of the thermoplastic polyester include polyethylene terephthalate, polyethylene naphthalate, polybutylene terephthalate, and the like. From the viewpoint of water resistance, heat resistance, and molding properties, polyethylene terephthalate is preferable.

In order to impart the polarizing property to the functional layer, a dichroic dye or the like can be added to the functional layer made of the thermoplastic resin. As the dichroic dye, known dyes are used. Such dyes are disclosed, for example, in Japanese Unexamined Patent Publication No. S61-087757, Japanese Unexamined Patent Publication No. S61-285259, Japanese Unexamined Patent Publication No. S62-270664, Japanese Unexamined Patent Publication No. S62-275163, Japanese Unexamined Patent Publication No. H1-103667, and the like. Specific examples thereof include an anthraquinone-based dye, a quinophthalone-based dye, an azo-based dye, and the like.

In order to impart the specific wavelength absorbing property to the functional layer, a specific dye or an ultraviolet absorber can be added to the functional layer made of the thermoplastic resin. Typical examples of the dye include an anthraquinone-based dye, a perinone-based dye a monoazo-based dye, a diazo-based dye, a phthalocyanine-based dye, a porphyrin-based dye, a tetraazaporphyrin metal complex, a phthalocyanine compound, a squarylium compound, a porphyrin metal complex, a naphthalocyanine-based pigment, a merocyanine-based pigment, a methine-based pigment, and the like. Typical examples of the ultraviolet absorber include a benzophenone-based compound, a triazine-based compound, a benzotriazole-based compound, an indole-based compound, and the like. One kind of each of these compounds can be used singly, or two or more kinds of these compounds can be used in combination.

In order to impart the photochromic property to the functional layer, a dimming dye or a dimming pigment can be added to the functional layer made of the thermoplastic resin. For example, among a spiropyran-based compound, a spirooxazine-based compound, a fulgide-based compound, a naphthopyran-based compound, and a bisimidazole compound, one kind of compound or two or more kinds of compounds can be used as a typical dimming dye or dimming pigment according to the desired color.

In order to impart the toning property to the functional layer, a known pigment or the like can be added to the functional layer made of the thermoplastic resin.

In a case where the functional layer has a laminated structure in which at least another layer is laminated over the polymer layer, as long as the effects of the present invention are not impaired, various resin layers can be used as the another layer. As the resin composing the another layer, a resin different from the polymer layer is used. Examples of the another layer include a thermoplastic polycarbonate layer, a thermoplastic polyimide layer, a thermoplastic polyamide layer, a triacetyl cellulose (TAC) layer, and the like. In a case where the functional layer has a laminated structure, the strength is improved, and the shaping properties and workability can be improved.

The total thickness of the functional layer having a laminated structure is about 20 μm to 3 mm.

[Curable Adhesive Layer AD2]

The curable adhesive layer AD2 satisfies the following requirement (1).

(1) In a case where the adhesive layer AD2 is installed on a glass plate (surface plate) kept horizontal at 25° C. so that the adhesive layer AD2 does not stray from the glass plate, 32 g of a steel ball is placed on the adhesive layer AD2 and kept as it is for 10 seconds, and then the glass plate is slowly tilted, the upper limit of the angle at which the steel balls starts to roll is 5° or less, preferably 3° or less, and even more preferably 2° or less, and the lower limit of the angle is preferably 0.01° or greater.

In a case where the adhesive layer AD2 satisfies the requirement (1), for example, dust and the like are hardly attached to the adhesive layer of the functional layer with an adhesive layer, and it is easy to evenly bond the adhesive layer to a substrate. Therefore, it is possible to provide a functional layer with an adhesive layer including a functional layer and a substrate that excellently adhere to each other, particularly, excellently adhere to each other at a site having a small radius of curvature and remain excellently adhering to each other at the outer peripheral edge during annealing.

From the viewpoint of the effects of the present invention, it is preferable that the adhesive layer AD2 further satisfy the following requirement (2).

(2) In a case where the adhesive layer AD2 is cured at 90° C. for 2 hours, and then tested under a load of 0.1 mN at 25° C. so as to measure an elastic deformation amount a and a plastic deformation amount b, the lower limit of a ratio of b to a (b/a) is 0.01 or higher, preferably 0.1 or higher, even more preferably 1 or higher, and most preferably 1.5 or higher, and the upper limit of the ratio (b/a) is 100 or lower, preferably 50 or lower, more preferably 10 or lower, and particularly preferably 5 or lower.

Presumably, in a case where the ratio of the plastic deformation amount b to the elastic deformation amount a is within the above range, in processing the outer peripheral edge of the functional layer with an adhesive layer, by allowing the adhesive layer to undergo plastic deformation to an appropriate extent while transmitting the force applied to the functional layer by the elasticity, the adhesive layer could be easily cut off (unprocessed residues may be reduced) and/or the adhesiveness between the functional layer and the adhesive layer could be maintained.

The lower limit of the plastic deformation amount b is greater than 0, preferably 0.01 or greater, more preferably greater than 0.05, and particularly preferably 0.1 or greater. The upper limit of the plastic deformation amount b is 1 or less, preferably 0.9 or less, more preferably 0.8 or less, and particularly preferably 0.6 or less.

In a case where the plastic deformation amount b is within the above range, particularly the deformation caused by the force applied to the curable adhesive layer during transport or processing, for example, chuck marks made during transport using chucks tend to be reduced.

The elastic deformation amount and the plastic deformation amount can be measured under the following conditions.

Measurement machine: dynamic ultra-micro hardness tester DUH-W201S (manufactured by Shimadzu Corporation)

Indenter: triangular pyramid indenter made of diamond (inter-edge angle: 115°)

Temperature: 25° C.

Humidity: 50%

Maximum load: 0.1 mN

Depth 1: maximum indentation depth (μm) obtained in a case where set load (0.1 mN) is applied Depth 2: indentation depth obtained after removing load (μm) . . . (plastic deformation amount)

Depth 1-Depth 2 (μm) . . . (elastic deformation amount)

In a case where the adhesive layer AD2 satisfies both the requirements (1) and (2), it is possible to provide a functional layer with an adhesive layer in which the functional layer exhibits excellent adhesiveness to a substrate, exhibits higher adhesiveness to a substrate particularly at a site having a small radius of curvature, and exhibits higher adhesiveness to a substrate at the outer peripheral edge during annealing.

From the viewpoint of the effects of the present invention, it is preferable that the adhesive layer AD2 further satisfy the following requirement (3).

(3) In a case where the adhesive layer AD2 is cured at 90° C. for 2 hours, and then a load of 0.1 mN is removed at 25° C., the lower limit of a dynamic hardness (DHT115-2) of the adhesive layer AD2 is 0.01 or higher, preferably 0.1 or higher, more preferably 0.5 or higher, and particularly preferably 1 or higher, and the upper limit of the dynamic hardness is 5,000 or lower, preferably 3,000 or lower, more preferably 1,000 or lower, even more preferably 500 or lower, and particularly preferably 250 or lower.

Furthermore, in a case where the adhesive layer AD2 is cured at 90° C. for 2 hours, and a load of 0.1 mN is applied thereto at 25° C., the dynamic hardness (DHT115-1) of the adhesive layer AD2 is preferably 0.1 to 100, and more preferably 0.5 to 50.

The dynamic hardness can be measured under the following conditions.

Measurement machine: dynamic ultra-micro hardness tester DUH-W201S (manufactured by Shimadzu Corporation)

Indenter: triangular pyramid indenter made of diamond (inter-edge angle: 115°)

Maximum load: 0.1 mN

Depth 1: maximum indentation amount obtained in a case where set load (0.1 mN) is applied Depth 2: indentation depth obtained after removing load . . . (plastic deformation amount)

Depth 1-Depth 2 . . . (elastic deformation amount)

Dynamic hardness (DHT115-2): determined from depth 2 and maximum load (0.1 mN).

Dynamic hardness (DHT115-1): determined from depth 1 and maximum load (0.1 mN).

The principle of the dynamic hardness measurement is as follows.

The dynamic hardness (dynamic ultra-micro hardness) DHT115-1 is a hardness determined from the indentation depth obtained by applying testing load, and is calculated by the following formula. Furthermore, the dynamic hardness DHT115-2 is a hardness calculated by the same calculation method from the indentation depth obtained after removing load. Note that the calculation result includes the difference with the ideal shape of the indenter as errors.

$$DHT115 = 3.8584 \cdot P/D^2 \qquad \text{Formula:}$$

DHT115: dynamic hardness measured using triangular pyramid indenter with inter-edge angle of 115°

P: testing load (mN)

D: indentation depth (μm)

Furthermore, it is also preferable that after being cured at 90° C. for 2 hours, the adhesive layer AD2 have an indentation elastic modulus of $10^8$ to $10^{10}$ Pa which is measured at 25° C. by using the aforementioned ultra-micro hardness tester in an unloading process of removing a load of 0.1 mN.

The indentation elastic modulus (elastic modulus Y) is a value evaluated based on the degree of elastic recovery to the initial shape in the unloading process, and is calculated using the following formulas listed below. Note that the calculation result includes the difference with the ideal shape of the indenter as errors.

$$Y = \frac{E}{1-v^2} = \frac{1}{1/E_r - (1-v_i^2)/E_i}$$

$$E_r = \frac{\sqrt{\pi}}{2\sqrt{A}} \cdot \frac{dP}{dh}$$

$$A = 23.97 \cdot h_c^2$$

$$h_c = h_{max} - 0.75 \cdot (h_{max} - h_r)$$

The symbols in the formulas stand for the following.

Y: elastic modulus (Pa) of sample including Poisson's ratio

E: elastic modulus (Pa) of sample $E_i$: elastic modulus of diamond indenter ($1.14 \times 10^{12}$ Pa)

$E_r$: combined elastic modulus of sample and indenter (Pa)

v: Poisson's ratio of sample $v_i$: Poisson's ratio of diamond indenter (0.07)

A: projected area of indentation ($m^2$)

dP/dh: slope at start of unloading in load-indentation depth curve (N/m)

$h_c$: effective contact depth (m)

$h_{max}$: maximum indentation depth (m) . . . (depth 1)

$h_r$: intersection point between tangent line and depth axis at start of unloading (m) . . . (depth 3)

$h_{max}-h_r$: (depth 1)–(depth 3) . . . (depth 4)

From the viewpoint of the effects of the present invention, it is preferable that the adhesive layer AD2 further satisfy the following requirement (4).

(4) The lower limit of a storage modulus measured at 25° C. after curing the adhesive layer AD2 at 90° C. for 2 hours is 0.5 MPa or higher, preferably 1 MPa or higher, and more preferably 10 MPa or higher, and the upper limit of the storage modulus is 1,000 MPa or lower, preferably 800 MPa or lower, and more preferably 600 MPa or lower.

In a case where the adhesive layer AD2 satisfies the requirement (3) and/or the requirement (4), it is possible to provide a functional layer with an adhesive layer in which the functional layer exhibits particularly excellent adhesiveness to a substrate, exhibits particularly excellent adhesiveness to a substrate especially at a site having a small radius of curvature, and exhibits particularly excellent adhesiveness to a substrate at the outer peripheral edge during annealing.

After being cured at 90° C. for 2 hours, the curable adhesive layer AD2 can have an adhesive strength (JIS 21528; to glass) of 5 N/25 mm or higher, preferably 10 N/25 mm or higher, and more preferably 15 N/25 mm or higher.

In a case where the curable adhesive layer AD2 has adhesive strength described above, even in a case where the adhesive layer is bonded to a substrate or the like, sufficient adhesive strength can be secured.

It is preferable that the curable adhesive layer AD2 further satisfy the following requirement (5). Alternatively, the difference in a refractive index between the adhesive layer AD2 and a substrate is preferably 0.1 or less, and more preferably 0.05 or less. In a case where the above requirement is satisfied, the functional layer with an adhesive layer exhibits excellent optical characteristics even though the functional layer is used for optical uses. Particularly, it is possible to suppress birefringence in a case where the functional layer is laminated over a substrate.

(5) After being cured 90° C. for 2 hours, the adhesive layer AD2 has a refractive index (JIS K7142) of 1.45 or higher, preferably 1.50 or higher, and more preferably 1.60 or higher.

The thickness of the curable adhesive layer AD2 can be less than 100 μm, preferably 80 μm or less, and more preferably 50 μm or less. In the present embodiment, as long as the curable adhesive layer AD2 is provided, the lower limit of the thickness of the curable adhesive layer AD2 is not particularly limited. The lower limit is 5 μm or greater, preferably 10 μm or greater, and more preferably 20 μm or greater. In a case where the thickness of the curable adhesive layer AD2 is within the above range, the layer AD2 exhibits excellent adhesiveness to the functional layer or a substrate, and the adhesiveness between the functional layer and a substrate can be further improved.

The curable adhesive layer AD2 contains at least one kind of curable polymer selected from the group consisting of an ester-based resin, an epoxy-based resin, a urethane-based resin, and an acrylic resin, and a curing accelerator.

Examples of the ester-based resin include an ester-based resin, a polyester-based resin, a polyester-urethane-based resin, a (meth)acryl-polyester-based resin, and the like.

Examples of the epoxy-based resin include an epoxy-based resin, a (meth)acryl-epoxy-based resin, an epoxy-urethane-based resin, an epoxy-polyester-based resin, and the like.

Examples of the urethane-based resin include a urethane-based resin, a urethane-(meth)acrylic resin, a urethane-ester-based resin, and the like.

Examples of the (meth)acrylic resin include a (meth)acrylic resin, a (meth)acryl-urethane-based resin, an acryl-epoxy-based resin, an acryl-polyester-based resin, and the like. "(Meth) acryl" includes both the methacrylate and acrylate.

Examples of the curing accelerator include an amine-based compound, a metal complex-based compound, and the like.

The curable adhesive layer AD2 can contain other components such as an antioxidant, a light stabilizer, a deterioration inhibitor, and a UV absorber in addition to the resins described above.

It is preferable that the curable adhesive layer AD2 do not contain a component having a boiling point of 100° C. or lower. Because then the contamination of a lens can be inhibited in a step (thermal compression) of bonding the adhesive layer AD2 to the lens.

The functional layer with an adhesive layer of the present embodiment can be obtained by coating at least a part of a surface of a functional film with a curable adhesive. Examples of the coating method include known methods such as spin coating, dip coating, die coating, gravure coating, spray coating, and curtain (flow) coating. Alternatively, the functional layer with an adhesive layer of the present embodiment can also be obtained by a method of pressing a sheet-like curable adhesive layer on at least a part of a surface of a functional film, a heat lamination method, and the like.

The curable adhesive layer AD2 is arranged over at least a part of a surface of the functional layer, preferably on at least a part of one surface of the functional layer.

<Substrate with a Functional Layer>

The substrate with a functional layer of the present embodiment includes a functional layer, an adhesive layer AD2-1, and a substrate in this order.

The substrate with a functional layer of the present embodiment uses the functional layer with an adhesive layer described above. Therefore, the functional layer and the substrate exhibit excellent adhesiveness, exhibit excellent adhesiveness particularly at a site having a small radius of curvature, and exhibit excellent adhesiveness at the outer peripheral edge during annealing.

[Functional Layer]

As the functional layer in the present embodiment, it is possible to use the same functional layer as the functional layer described above regarding the functional layer with an adhesive layer.

[Adhesive Layer AD2-1]

The adhesive layer AD2-1 is disposed in at least a part of a space between two facing surfaces of the functional layer and the substrate. Furthermore, from the viewpoint of the effects of the present invention, it is preferable that the adhesive layer AD2-1 satisfy the following requirement (i).

(i) The lower limit of a ratio (b/a) of a plastic deformation amount b to an elastic deformation amount a measured at 25° C. under a load of 0.1 mN is 0.01 or higher, preferably 0.1 or higher, even more preferably 1 or higher, and most preferably 1.5 or higher, and the upper limit of the ratio (b/a) is 100 or lower, preferably 50 or lower, more preferably 10 or lower, and particularly preferably 5 or lower.

Presumably, in a case where the ratio of the plastic deformation amount b to the elastic deformation amount a is within the above range, in processing the outer peripheral edge of the functional layer with an adhesive layer, by allowing the adhesive layer to undergo plastic deformation to an appropriate extent while transmitting the force applied to the functional layer by elasticity, the adhesive layer could be easily cut off (unprocessed residues may be reduced) and/or the adhesiveness between the functional layer and the adhesive layer could be maintained.

The lower limit of the plastic deformation amount b is greater than 0, preferably 0.01 or greater, more preferably greater than 0.05, and particularly preferably 0.1 or greater. The upper limit of the plastic deformation amount b is 1 or less, preferably 0.9 or less, more preferably 0.8 or less, and particularly preferably 0.6 or less.

In a case where the plastic deformation amount b is within the above range, particularly the deformation caused by the force applied to the curable adhesive layer during transport or processing, for example, chuck marks made during transport using chucks tend to be reduced.

It is preferable that the adhesive layer AD2-1 further satisfy the following requirement (ii).

(ii) The lower limit of a dynamic hardness (DHT115-2) measured after removing a load of 0.1 mN at 25° C. is 0.01 or higher, preferably 0.1 or higher, more preferably 0.5 or higher, and particularly preferably 1 or higher, and the upper limit of the dynamic hardness is 5,000 or lower, preferably 3,000 or lower, more preferably 1,000 or lower, even more preferably 500 or lower, and particularly preferably 250 or lower.

It is also preferable that the dynamic hardness (DHT115-1) measured at 25° C. under a load of 0.1 mN be 1 to 100.

Furthermore, it is also preferable that the adhesive layer AD2-1 have an indentation elastic modulus of $10^8$ to $10^{10}$ Pa which is measured at 25° C. by using the aforementioned ultra-micro hardness tester in an unloading process of removing a load of 0.1 mN.

It is also preferable that the adhesive layer AD2-1 further satisfy the following requirement (iii).

(iii) The lower limit of a storage modulus at 25° C. is 0.5 MPa or higher, preferably 1 MPa or higher, and more preferably 10 MPa or higher, and the upper limit of the storage modulus is 1,000 MPa or lower, preferably 800 MPa or lower, and more preferably 600 MPa or lower.

The thickness of the adhesive layer AD2-1 is substantially the same as the thickness of the curable adhesive layer AD2, which can be less than 100 μm, preferably 80 μm or less, and more preferably 50 μm or less. In the present embodiment, as long as the adhesive layer AD2-1 is provided, the lower limit of the thickness of the adhesive layer AD2-1 is not particularly limited. The lower limit is 5 μm or greater, preferably 10 μm or greater, and more preferably 20 μm or greater.

The adhesive layer AD2-1 can be obtained by curing the curable adhesive layer AD2. Examples of the curing method include heat curing, a curing method by irradiation with energy rays such as ultraviolet rays or visible rays, and the like. For example, as will be described later, by bringing the curable adhesive layer AD2 into contact with a surface of a substrate and then curing the layer AD2, the adhesive layer AD2-1 can be formed. The substrate and a functional layer can be bonded to each other via the adhesive layer AD2-1.

[Substrate]

The substrate may be a thermoplastic resin or a thermosetting resin. The shape of the substrate is not limited to the lens shape or the like. Examples of the thermoplastic resin include a polycarbonate resin, a polyester resin, a polyester copolymer, a polyamide (nylon) resin, a polyimide resin, a poly(meth)acrylate resin, a polyolefin resin, and the like. Among these, the polycarbonate resin, the polyester resin, the polyamide (nylon) resin, or the like is preferable.

Examples of the thermosetting resin include a polyurea urethane resin, a poly(thio)urethane resin, a polysulfide resin, a poly(thio)(meth)acrylate resin, an allyl diglycidyl carbonate (ADC) resin, and the like. The thermosetting resin can be obtained by curing and molding a polymerizable composition containing a polymerizable compound by a predetermined method. Examples of the polymerizable compound contained in the polymerizable composition include a polyisocyanate compound and a poly(thi)ol compound. Furthermore, the substrate may be inorganic (optical) glass. Having high transparency, these materials can be suitably used as a resin substrate for optical materials. These materials may be used singly, or used as a composite material.

The polyisocyanate compound to be used can be selected from conventionally known compounds as long as the effects of the present invention can be obtained. Examples thereof include the compounds listed in WO2011/055540.

Specific examples of the polyisocyanate compound include xylylene diisocyanate, phenylenediisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, bis(isocyanatocyclohexyl)methane, hexamethylene diisocyanate, pentamethylene diisocyanate, isophorone isocyanate, and the like. At least one kind of compound selected from these can be used.

Among the poly(thi)ol compounds, the polyol compound to be used can be selected from conventionally known compounds as long as the effects of the present invention can be obtained. For example, the compounds disclosed in WO2017/47725 can be used.

The polythiol compound to be used can be selected from conventionally known compounds as long as the effects of the present invention can be obtained. For example, the compounds disclosed in WO2008/105138 can be used.

Specific examples of the polythiol compound include pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio) propane, 4,6-bis(mercaptomethylthio)-1,3-dithiane, 2-(2,2-bis(mercaptomethylthio)ethyl)-1,3-dithiethane, ethylene glycol bis(3-mercaptopropionate), and the like. At least one kind of compound selected from these can be used.

The substrate with a functional layer of the present embodiment uses the functional layer with an adhesive layer. Therefore, the functional layer and the substrate exhibit excellent adhesiveness even on a surface of the substrate having a small radius of curvature, and exhibit excellent adhesiveness even on a surface of the substrate with a lens front curve of 6 C or higher. The surface of the substrate having a small radius of curvature is an example. The functional layer also exhibits excellent adhesiveness to the surface of a substrate having irregularity.

The thickness of the substrate is about 1 to 20 mm.

[Method for Manufacturing Substrate with Functional Layer]

The substrate with a functional layer of the present embodiment is not particularly limited, and can be prepared by laminating the curable adhesive layer AD2 of the functional layer with an adhesive layer on one surface of a substrate, and curing the curable adhesive layer AD2 by heat curing or irradiation with energy rays such as ultraviolet rays or visible rays so as to form the adhesive layer AD2-1.

The prepared substrate with a functional layer may be subjected to a treatment such as annealing. The treatment is performed generally at a temperature of 50° C. to 150° C., preferably at a temperature of 90° C. to 140° C., and more preferably at a temperature of 90° C. to 130° C.

The substrate with a functional layer of the present embodiment uses the functional layer with an adhesive layer. Therefore, the functional layer and the substrate exhibit excellent adhesiveness even during annealing. Furthermore, if necessary, a hard coat layer, an antireflection layer, an antifogging layer, an antifouling layer, a water repellent layer, or a dimming layer can be formed on the substrate with a functional layer.

<Laminate>

The laminate of the present embodiment includes a protective layer, a functional layer, the adhesive layer AD2-1, and a substrate in this order. The adhesive layer AD2-1 is disposed in at least a part of a space between two facing surfaces of the functional layer and the substrate.

In the laminate of the present embodiment, the functional layer and the substrate exhibit excellent adhesiveness, exhibit excellent adhesiveness particularly at a site having a small radius of curvature, and exhibit excellent adhesiveness at the outer peripheral edge during annealing. The laminate of the present embodiment inhibits unprocessed residues from remaining at the outer peripheral edge during the outer periphery processing performed on a substrate such as a lens, and reduces the amount of scraping residues.

The functional layer, the adhesive layer AD2-1, and the substrate will not be described because these are the same as those in the embodiment described above.

[Protective Layer]

It is preferable that the protective layer satisfy the following requirements (a), (b), and (c).

(a) The lower limit of the thickness is 10 μm or greater, preferably 20 μm or greater, and more preferably 30 μm or greater, and the upper limit of the thickness is 1 mm or less, preferably 0.8 mm or less, and more preferably 0.5 mm or less.

(b) The lower limit of a ratio (b/a) of a plastic deformation amount b to an elastic deformation amount a measured at 25° C. under a load of 0.1 mN is 0.1 or higher, preferably 0.5 or higher, even more preferably 1 or higher, and most preferably 1.5 or higher, and the upper limit of the ratio (b/a) is 10 or lower, preferably 5 or lower, and more preferably 2 or lower.

(c) The lower limit of a dynamic hardness (DHT115-2) measured after removing a load of 0.1 mN at 25° C. is 400 or higher, preferably 500 or higher, and more preferably 550 or higher, and the upper limit of the dynamic hardness is 3,000 or lower, preferably 2,500 or lower, and more preferably 2,000 or lower.

In a case where the protective layer satisfies all the requirements of (a), (b), and (c), unprocessed residues and/or chippings are inhibited from chipping at the outer peripheral edge during the outer periphery processing of a lens.

It is also preferable that the dynamic hardness (DHT115-1) measured at 25° C. under a load of 0.1 mN be 70 to 150.

Furthermore, it is also preferable that the protective layer have an indentation elastic modulus of $5 \times 10^9$ to $2 \times 10^{10}$ Pa which is measured at 25° C. by using the aforementioned ultra-micro hardness tester in an unloading process of removing a load of 0.1 mN.

From the viewpoint of the effects of the present invention, it is preferable that the protective layer further satisfy the following requirement (d).

(d) The lower limit of the pencil hardness is HB or higher, preferably H or higher, and more preferably 2H, and the upper limit of the pencil hardness is 9H or lower, and preferably 6H or lower.

The lower limit of the Young's modulus of the protective layer is preferably 0.3 GPa or higher, more preferably 0.5 GPa or higher, and even more preferably 1 GPa or higher. The upper limit of the Young's modulus of the protective layer is preferably 10 GPa or lower, more preferably 8 GPa or lower, and even more preferably 5 GPa or lower.

In a case where the Young's modulus is in the above range, the flexibility and toughness of the protective layer are excellent. Therefore, unprocessed residues are further inhibited from remaining at the outer peripheral edge during the outer periphery processing of a lens.

The protective layer is formed by coating the functional layer with a resin composition by a known coating method such as spin coating, dip coating, or casting, and then curing the composition. The coating method is appropriately selected according to the film thickness or surface shape of the protective layer. For example, in order to form a protective layer having a thickness of about 300 μm, spin coating, dip coating, or the like is preferable. In order to form a thicker protective layer, from the viewpoint of the surface shape, a casting method is preferable.

The protective layer can also be prepared by laminating a resin sheet or a film.

In a case where the protective layer is prepared by laminating a resin sheet or a film, it is preferable that the resin sheet or film satisfy the following requirement (e).

(e) The lower limit of the flexibility is 0 mm or greater, preferably 2 mm or greater, and more preferably 3 mm or greater, and the upper limit of the flexibility is 100 mm or less, preferably 50 mm or less, and more preferably 40 mm or less.

The flexibility means the minimum diameter of a cylinder around which the resin sheet or film can be wound without breaking or cracking in a case where the resin sheet or film is wound around the cylinder having a certain diameter.

In a case where the resin sheet or film composing the protective layer satisfies the requirement (e), unprocessed residues are further inhibited from remaining at the outer peripheral edge during the outer periphery processing of a lens.

Examples of the curable resin contained in the protective layer include optical materials represented by an epoxy-based resin, a urethane acrylate-based resin, an epoxy acrylate-based resin, a urethane-based resin, an acrylic resin, a thiourethane-based resin, and the like. At least one kind of resin selected from these can be used.

Generally, the protective layer can be formed by coating the functional layer with a resin composition by a known coating method such as spin coating, dip coating, spray coating, or curtain coating, and then curing the composition. The protective layer can also be formed by a casting method. In a case where the protective layer is formed by the casting method, it is preferable that the protective layer contain (thio) urethane, urethane urea, (meth)acryl, epoxy, urethane (meth)acrylate, episulfide, or allyl diglycidyl carbonate. The laminate of the present embodiment can be obtained by forming the protective layer on the functional layer of the substrate with a functional layer. Examples of the curing method include heat curing, a curing method by irradiation with energy rays such as ultraviolet rays or visible rays, and the like. In order to inhibit the occurrence of interference fringes, the difference in a refractive index between the protective layer and a lens is preferably in a range of ±0.1.

It is preferable that the laminate of the present embodiment include an adhesive layer AD1-1 between the protective layer and the functional layer. It is preferable that the adhesive layer AD1-1 satisfy the following requirement (i).

(i) The lower limit of a ratio (b/a) of a plastic deformation amount b to an elastic deformation amount a measured at 25° C. under a load of 0.1 mN is 0.01 or higher, preferably 0.1 or higher, even more preferably 1 or higher, and most preferably 1.5 or higher, and the upper limit of the ratio (b/a) is 100 or lower, preferably 50 or lower, more preferably 10 or lower, and particularly preferably 5 or lower.

Presumably, in a case where the ratio of the plastic deformation amount b to the elastic deformation amount a is within the above range, in processing the outer peripheral edge of the functional layer with an adhesive layer, by allowing the adhesive layer to undergo plastic deformation to an appropriate extent while transmitting the force applied to the functional layer by elasticity, the adhesive layer could be easily cut off (unprocessed residues may be reduced) and/or the adhesiveness between the functional layer and the adhesive could be maintained.

The lower limit of the plastic deformation amount b is greater than 0, preferably 0.01 or greater, more preferably greater than 0.05, and particularly preferably 0.1 or greater. The upper limit of the plastic deformation amount b is 1 or less, preferably 0.9 or less, more preferably 0.8 or less, and particularly preferably 0.6 or less.

In a case where the plastic deformation amount b is within the above range, particularly the deformation caused by the force applied to the curable adhesive layer during transport or processing, for example, chuck marks made during transport using chucks tend to be reduced.

It is preferable that the adhesive layer AD1-1 further satisfy the following requirement (ii).

(ii) The lower limit of a dynamic hardness (DHT115-2) measured after removing a load of 0.1 mN at 25° C. is 0.01 or higher, preferably 0.1 or higher, more preferably 0.5 or higher, and particularly preferably 1 or higher, and the upper limit of the dynamic hardness is 5,000 or lower, preferably 3,000 or lower, more preferably 1,000 or lower, even more preferably 500 or lower, and particularly preferably 250 or lower.

It is also preferable that after being cured at 90° C. for 2 hours, the adhesive layer AD1-1 have a dynamic hardness (DHT115-1) of 1 to 100 under a load of 0.1 mN at 25° C.

Furthermore, it is also preferable that the adhesive layer AD2-1 have an indentation elastic modulus of $10^8$ to $10^{10}$ Pa which is measured at 25° C. by using the aforementioned ultra-micro hardness tester in an unloading process of removing a load of 0.1 mN.

It is also preferable that the adhesive layer AD1-1 further satisfy the following requirement (iii).

(iii) The lower limit of a storage modulus at 25° C. is 0.5 MPa or higher, preferably 1 MPa or higher, and more preferably 10 MPa or higher, and the upper limit of the storage modulus is 1,000 MPa or lower, preferably 800 MPa or lower, and more preferably 500 MPa or lower.

The adhesive layer AD1-1 can be obtained by curing the curable adhesive layer AD1. As the curable adhesive layer AD1, the curable adhesive layer AD2 can be used. The curable adhesive layer AD2 may be the same as or different from the curable adhesive layer AD1.

In the present embodiment, by providing the curable adhesive layer AD1 on the functional layer of the functional layer with an adhesive layer (curable adhesive layer AD2/ functional layer), bonding the curable adhesive layer AD2 onto a substrate, and then curing the layers AD1 and AD2, it is possible to form the adhesive layer AD2-1 and the adhesive layer AD1-1 (substrate with a functional layer). Alternatively, by bonding the curable adhesive layer AD2 of the functional layer with an adhesive layer (curable adhesive layer AD2/functional layer) onto a substrate, providing the curable adhesive layer AD1 on the functional layer, and then curing the layer s AD1 and AD2, it is possible to form the adhesive layer AD2-1 and the adhesive layer AD1-1 (substrate with a functional layer).

Then, by a method of coating the adhesive layer AD1-1 of the substrate with a functional layer with the aforementioned resin composition and curing the composition, a method of laminating the resin composition on the adhesive layer AD1-1 by a casting method and curing the composition, a method of bonding the aforementioned resin sheet onto the adhesive layer AD1-1, or the like, it is possible to form the protective layer (laminate).

In a case where the laminate is prepared by the above method, the adhesiveness between the protective layer and the functional layer is improved, unprocessed residues are further inhibited from remaining at the outer peripheral edge during the outer periphery processing of a lens, and the amount of scraping residues is further reduced.

If necessary, a hard coat layer, an antireflection layer, an antifogging layer, an antifouling layer, a water repellent layer, or a dimming layer can be formed on the protective layer.

<Optical Component>

The optical component of the present embodiment can be composed of the substrate with a functional layer or the laminate described above. The adhesive layer AD2-1 can come into contact with at least a part of a surface of the lens. As the substrate, a lens having a refractive index of 1.49 or higher is preferable.

Examples of the optical component include a polarizing lens including a polarizing functional layer, a blue light blocking lens including a functional layer that absorbs a specific wavelength, a lens that blocks a specific wavelength (NeoContrast® (blocking 585 nm)), a photochromic lens including a functional layer having dimming properties, and the like. Usually, as for a lens (substrate), a surface on which a functional layer is laminated faces an object, and the opposite surface faces an eye.

The embodiments of the present invention have been described so far. However, the embodiments are merely examples of the present invention, and various other constitutions can be adopted as long as the effects of the present invention are not impaired.

EXAMPLE

Hereinafter, the present invention will be more specifically described with reference to examples, but the present invention is not limited thereto.

In the present example, physical properties were measured by the following methods.

<Tackiness>

Two flat glass plates having a length of 580 mm on each side and a thickness of 10 mm were prepared. At 25° C., one of the glass plates was placed on the other used as a base, and the curable adhesive layer AD2 having a length of 5 cm on each side was installed thereon. 32 g of a steel ball is placed on the curable adhesive layer AD2 and kept as it was for 10 seconds, and then one end face of the upper glass plate was slowly raised. At this time, an angle DEG at which the steel ball rolled down from the curable adhesive layer AD2 was measured (the angle was calculated by the inverse trigonometric function ARC SIN (height/hypotenuse) wherein the height means the length by which the one end was raised and the hypotenuse means the length of the glass plate), and evaluated as tackiness. 32 g of the steel ball placed on the glass plate rolled at an angle of 0.49°.

<Storage Modulus>

By using a storage modulus analyzer (DVA (manufactured by ITK Co.), RSA-3 (manufactured by Texas Instruments), DMA-6100 (manufactured by Seiko Instruments Inc.), and a measurement device (Physica MCR301) manufactured by Anton Paar GmbH, the storage modulus of the cured adhesive layer was measured at a frequency of 1 Hz and 25° C.

<Parallel Light Transmittance (Unit: %)>

By using Haze Meter (manufactured by NIPPON DENSHOKU INDUSTRIES Co., LTD., model: NDH 2000), the total light transmittance of the adhesive layer having a thickness of 2 mm was measured. In a case where the adhesive layer exhibited anisotropy in MD direction and TD direction, the total light transmittance was measured in each of the TD direction and the MD direction, and the average thereof was taken as the total light transmittance of the adhesive layer.

<Pencil Hardness Test>

The Pencil Test (pencil hardness test) specified in ISO15 184 was carried out to check the pencil hardness of the protective layer.

<Flexibility>

Cylinders having a diameter of 1 mm to 100 mm were arranged at an interval of 1 mm, and each film was tightly wound around the cylinders. At this time, the minimum diameter of a cylinder around which the film could be wound without breaking or cracking was regarded as flexibility. Flexibility of 0 mm means that the film does not crack even being bent.

<Young's Modulus>

With reference to the bending strength test described in JIS A5905, for a test piece having a thickness of 3 mm, a width of 50 mm, and a length of 150 mm, the Young's modulus (flexural modulus of elasticity) was measured at one spot in the MD direction and the TD direction in an environment of 23° C. and 50% RH under the conditions of a span length of 100 mm and a bending rate of 50 mm/min, and the average thereof was adopted.

<Testing with Micro Hardness Tester>

Measurement machine: dynamic ultra-micro hardness tester DUH-W201S (manufactured by Shimadzu Corporation)

Indenter: triangular pyramid indenter made of diamond (inter-edge angle: 115°)

Temperature: 25° C.

Humidity: 50%

Maximum load: 0.1 mN

Depth 1: maximum indentation amount (μm) obtained in a case where set load (0.1 mN) is applied (The maximum indentation amount was measured in a place where no influence was exerted on the underlayer such as a substrate layer.)

Depth 2: indentation depth obtained after removing load (μm) . . . (plastic deformation amount)

Depth 1-Depth 2 (μm) . . . (elastic deformation amount)

Dynamic hardness (DHT115-1): calculated from depth land maximum load (0.1 mN) by the following formula.

Dynamic hardness (DHT115-2): calculated from depth 2 and maximum load (0.1 mN).

$$DHT115 = 3.8584 \cdot P/D^2 \qquad \text{Formula:}$$

DHT115: dynamic hardness measured using triangular pyramid indenter with inter-edge angle of 115°

P: testing load (mN)

D: indentation depth (μm)

Indentation elastic modulus (Pa): value evaluated based on degree of elastic recovery to initial shape in unloading process, calculated using the above formula.

<Adhesiveness at Outer Peripheral Edge (after Bonding, Before Curing): Corresponding to Adhesion at Outer Peripheral Edge of High Curvature Lens (Higher than 6 C at the Time of Bonding) in Table>

Under the conditions described in examples, the functional layer with the curable adhesive layer AD2-1 was bonded to a 6 C lens such that the adhesive layer came into contact with the convex surface of the lens. After 10 minutes, whether the functional layer was peeled off from the substrate at the outer peripheral edge of the lens edge was evaluated based on the following standard.

A: Substantially no peeling from the substrate is observed around the entire peripheral edge of the lens. Alternatively, although slight peeling is observed in a region accounting for ¼ or less of the entire periphery of the lens, the peeling is not noticeable (the functional layer is peeled off 0 to 0.3 mm toward the center from the outer peripheral edge).

B: Peeling from the substrate is observed at the edge of at least a part of the outer periphery of the lens (the functional layer is peeled off not more than 2 to 3 mm toward the center from the outer peripheral edge).

C: Peeling from the substrate is clearly observed at the edge of at least a part of the outer periphery of the lens (the functional layer is peeled off 3 mm or more toward the center from the outer peripheral edge).

<Adhesiveness at Outer Peripheral Edge (after Curing, Before Edging Process): Corresponding to Adhesion at Outer Periphery of Lens (During Annealing) in Table>

The lens obtained by bonding and curing in Adhesiveness at outer peripheral edge (after bonding, before curing) described above was subjected to an annealing treatment at 120° C. for 2 hours, and then the adhesiveness of the functional layer to the substrate was evaluated. The evaluation standard is the same as the evaluation standard in Adhesiveness at outer peripheral edge (after bonding, before curing).

<Adhesiveness at Outer Peripheral Edge (During Edging Process): Corresponding to Unprocessed Residues in Table 2>

The lens without a protective layer was subjected to an edging process, and at this time, the adhesiveness of the functional layer to the substrate was evaluated. The evaluation standard is the same as the evaluation standard in Adhesiveness at outer peripheral edge.

The lens including a protective layer was subjected to an edging process, and the adhesiveness between the protective layer and the functional layer at the outer peripheral edge of the lens was evaluated based on the following standard.

A: Scraping residues (burrs or residues attached) and appearance defects (peeling or cracking) are not observed.

B: Although scraping residues are not observed, appearance defects are observed in a range extending 0.3 mm or less from the outer peripheral edge toward the center.

C: Scraping residues are observed, and appearance defects extending more than 0.3 mm toward the center from the outer peripheral edge are observed.

<Chuck Mark During Processing>

Under the conditions described in examples, the lens to which the functional layer with an adhesive layer was bonded was subjected to an edging process, and then whether the chuck fixing the lens during the processing imposed strain on the adhesive layer and left marks on the functional layer was visually evaluated.

<Evaluation of Unprocessed Residues>

Before the back surface of the lens was ground for setting power, the outer peripheral edge of the lens was trimmed (ground) with a curve generator (manufactured by Satisloh AG.). At this time, whether or not unprocessed residues remain and fluff up (fine splits, also called fluff) at the outer periphery of the functional layer were evaluated.

C: The functional layer is deformed or peeled off from the lens during processing, or the maximum length of the unprocessed residues is greater than 1 mm.

B: The maximum length of the unprocessed residues is greater than 0.5 mm and 1 mm or less.

A: The maximum length of the unprocessed residues is 0.5 mm or less.

AA: Unprocessed residues are not visually observed, and the ground surface is smooth.

A flat grinding process with an edger (edging machine: LEX1000 from NIDEK CO., LTD) did not result in appearance defect (peeling or cracking), scraping residues (burrs or residues attached), and abnormal stop (sticking to the probe caused by burrs or residues attached). In a case where the attached residues were easily removed by hand, the test piece was classified as A.

Example 1

By an extrusion film molding method which is a known technique, dry pellet-like polyethylene terephthalate was kneaded with a dichroic pigment, a toning pigment, functional materials, other additive, and the like and extruded from a T-die, thereby molding a film. The film was uniaxially stretched, thereby obtaining a polarizing film made of polyethylene terephthalate [glass transition temperature: 70.7° C.] (thickness: 100 to 140 microns). An adhesive for a polyester-based thermosetting sheet (NIKAFLEX® SAFS manufactured by NIKKAN INDUSTRIES Co., Ltd., tackiness: 0.9°, storage modulus after curing: 400 MPa) was laminated on a surface of the film at 100° C., or a surface of the film is directly coated with the adhesive and dried, thereby obtaining a functional layer with the curable adhesive layer AD2.

Then, 50.6 parts by weight of m-xylylene diisocyanate, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane, 0.01 parts by weight of dibutyltin dichloride as a curing accelerator, 0.1 part by weight of Zelec UN (registered trademark, manufactured by Stepan Company) as a release agent, and 0.05 part by weight of Seesorb 709 (manufactured by SHIPRO KASEI KAISHA, LTD.) as an ultraviolet absorber were stirred and dissolved. Thereafter, the mixture was subjected to defoaming treatment under reduced pressure and then immediately used as a monomer mixture for to be injected. The viscosity of the mixture measured at 20° C. 1 hour after stirring and dissolving was 30 mPa·s. The monomer mixture to be injected (lens material 1) was injected into a lens molding die, heated in an oven to 100° C. from 25° C. for 16 hours, then kept at 100° C. for 10 hours, and slowly cooled, and then the lens molding die was taken out of the oven. The lens was released from the lens molding die and annealed at 115° C. for 2 hours, thereby obtaining a lens in the form of a semi-finished lens having an outer diameter of 75φ, a radius of curvature of 88 mm, and a central thickness of 15 mm.

The adhesive layer AD2 of the functional layer with the curable adhesive layer AD2 was brought into contact with the convex surface of the above lens having a radius of curvature of 88 mm, heated at 160° C., bonded to the lens while being stretched along the convex surface so as to be laminated on the lens, and cured at 90° C. for 2 hours, thereby preparing a substrate with a functional layer including a functional layer, the adhesive layer AD2-1, and a lens (substrate) in this order (hereinafter, also called "lens with a functional layer" in a case where a lens is used as a substrate). The refractive index (JIS K7142) of the adhesive layer AD2-1 was 1.67.

Even after curing at 90° C. for 2 hours, no peeling or detachment from adhesive occurred on the outer periphery.

Furthermore, after being cured, the lens with a functional layer was put into an oven at 120° C. for 2 hours and annealed. As a result, outer peripheral peeling or adhesion failure did not occur.

Subsequently, before the back surface of the lens was ground, the outer periphery was ground and trimmed with a curve generator (manufactured by Satisloh AG.), thereby obtaining a lens having an outer diameter of 74 and a central thickness of 2 mm.

Thereafter, the lens with a functional layer was subjected to an edging process using an edger (edging machine) (LEX-1000) manufactured by NIDEK CO., LTD. in a dry mode so as to form a lens having a width of 49 mm and a height of 28 mm, and the adhesiveness between the functional layer and the lens (substrate) and the like were evaluated.

The evaluation results are shown in Table 1.

Example 2

An RAV 7AT substrate (lens) having a diameter of 75φ, a central thickness of 2 mm, and a radius of curvature of 88 mm was prepared according to a known preparation method in the same procedure as in Example 1, except that the material was changed to RAV 7AT (diallyl 2,2'-oxydiethyl-dicarbonate, manufactured by ACOMON AG) which is a commercially available lens material.

The adhesive layer was cured at 90° C. for 2 hours in the same manner as in Example 1, but peeling or functional layer displacement was not observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm, and the adhesiveness between the functional layer and the lens (substrate) and the like were evaluated.

The lens was excellent in which no peeling occurred between the functional layer and the substrate and the functional layer did not leave unprocessed residues.

The evaluation results are shown in Table 1.

Example 3

N,N-dimethylcyclohexylamine (0.007 parts by mass) and 0.032 parts by mass of N,N-dicyclohexylmethylamine were dissolved in 31.8 parts by mass of bis(2,3-epithiopropyl) disulfide, 3.2 parts by mass of a mixture containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components was added thereto, and the obtained mixture was stirred at 20° C. for 30 minutes, thereby preparing a mixed solution. This mixed solution was defoamed at 600 Pa for 1 hour, filtered through a 1 μm PTFE filter, and then injected into a glass mold for plano processing having a central thickness of 2 mm and a diameter of 80 mm. The glass mold was slowly heated up to 80° C. from 30° C. for 19 hours, and kept at 80° C. for 2 hours. The mold was then cooled to room temperature, and a lens was taken out of the glass mold. The obtained lens was annealed at 120° C. for 3 hours, thereby obtaining a lens (refractive index: 1.74) in the form of a semi-finished lens having an outer diameter of 75φ, a radius of curvature of 88 mm, and a central thickness of 2 mm.

In the same manner as in Example 1, while being stretched, the functional layer with an adhesive layer was bonded to the substrate and cured at 90° C. for 2 hours, thereby obtaining a lens with a functional layer having a functional layer with a refractive index of 1.74, the adhesive layer AD2-1, and a lens (substrate) in this order.

The curable adhesive layer AD2 was cured at 90° C. for 2 hours, but peeling or functional layer displacement was not particularly observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

The evaluation results are shown in Table 1.

Example 4

A substrate (lens) having a diameter of 75φ, a central thickness of 2 mm, and a radius of curvature of 88 mm was prepared according to a known preparation method in the same procedure as in Example 1, except that the material was changed to a lens material 2 (2,5-bis(isocyanatomethyl) bicyclo-[2.2.1]-heptane, 2,6-bis(isocyanatomethyl) bicyclo-[2.2.1]-heptane, 4-mercaptomethyl-1,8-dimercapto-3,6-dithiaoctane, pentaerythritol tetrakis(3-mercaptopropionate)).

By using UPILEX (polyimide film, manufactured by UBE INDUSTRIES, LTD., film thickness: 50 microns) as a functional layer, a functional layer with an adhesive layer was obtained in the same manner as in Example 1. Then, while being stretched, the functional layer was bonded to the substrate of the lens material 2, and cured at 90° C. for 2 hours, thereby obtaining a lens with a functional layer.

The curable adhesive layer AD2 was cured at 90° C. for 2 hour in the same manner as in Example 1, but peeling or functional layer displacement was not particularly observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

The evaluation results are shown in Table 1.

Example 5

A substrate (lens) having a diameter of 75φ, a central thickness of 2 mm, and a radius of curvature of 88 mm was prepared according to a known method in the same procedure as in Example 1, except that the material was changed to the lens material 2.

By using commercially available TAC/PVA/TAC (manufactured by Sumitomo Bakelite Co., Ltd., total thickness: 200 microns (PVA layer: 100 μm, TAC layers on both sides: 50 μm)) as a functional layer, a functional layer with an adhesive layer was obtained in the same manner as in Example 1. Then, while being stretched, the functional layer was bonded to the substrate of the lens material 2 and cured at 90° C. for 2 hours, thereby obtaining a lens with a functional layer.

The curable adhesive layer AD2 was cured at 90° C. for 2 hours in the same manner as in Example 1, but peeling or functional layer displacement was not particularly observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

The evaluation results are shown in Table 1.

Example 6

A substrate (lens) having a diameter of 75φ, a central thickness of 2 mm, and a radius of curvature of 88 mm was prepared according to a known method in the same procedure as in Example 1, except that the material was changed to the lens material 2.

By using commercially available PC/PVA/PC (manufactured by Sumitomo Bakelite Co., Ltd., total thickness: 700 microns (PVA layer: 60 μm, PC layers on both sides: 320 μm)) as a functional layer, a functional layer with an adhesive layer was obtained in the same manner as in Example 1. Then, while being stretched, the functional layer was bonded to the substrate of the lens material 2 and cured at 90° C. for 2 hours, thereby obtaining a lens with a functional layer.

The curable adhesive layer AD2 was cured at 90° C. for 2 hours in the same manner as in Example 1, but peeling or functional layer displacement was not particularly observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

The evaluation results are shown in Table 1.

Example 7

In the same procedure as in Example 1, SAFN manufactured by NIKKAN INDUSTRIES Co., Ltd. (storage modulus after curing: 400 MPa) was laminated at 100° C. on a surface of a polarizing film made of polyethylene terephthalate [glass transition temperature: 70.7° C.] (thickness: 100 to 140 microns), or a surface of the polarizing film was directly coated with SAFN and dried, thereby obtaining a functional layer with the curable adhesive layer AD2. In addition, by changing the material to the lens material 2, a substrate (lens) having a diameter of 75φ, a central thickness of 2 mm, and a radius of curvature of 88 mm was prepared according to a known preparation method.

The adhesive layer was cured at 90° C. for 2 hours in the same manner as in Example 1, but peeling or functional layer displacement was not observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm, and the adhesiveness between the functional layer and the lens (substrate) and the like were evaluated.

The lens was excellent in which no peeling occurred between the functional layer and the substrate and the functional layer did not leave unprocessed residues.

The evaluation results are shown in Table 1.

Comparative Example 1

A substrate (lens) having a diameter of 75φ, a central thickness of 2 mm, and a radius of curvature of 88 mm was prepared according to a known method in the same procedure as in Example 1, except that the material was changed to the lens material 2.

A functional layer with an adhesive layer was obtained in the same manner as in Example 1, except that a commercially available acrylic pressure-sensitive adhesive having a layer thickness of 100 microns (manufactured by FUJIMORI KOGYO CO., LTD.) (tackiness: 11.7°, storage modulus: 0.03 MPa) was used as the adhesive layer AD2-1 and laminated at room temperature. Then, while being stretched, the functional layer with an adhesive layer was bonded to the substrate of the lens material 2, thereby obtaining a lens with a functional layer.

Because the pressure-sensitive adhesive layer does not need to be heat-cured, annealing was performed at 120° C. for 2 hours. As a result, substantially all of the peripheral portion was peeled off except for a central portion having a diameter of about 5 cm.

Then, the lens with a functional layer was subjected to an edging process using an edger (edging machine) (LEX-1000) manufactured by NIDEK CO., LTD. in a dry mode so as to form a lens having a width of 40 mm and a height of 28 mm. As a result, the chuck mounted on the device for scraping left marks on the lens.

The evaluation results are shown in Table 1.

Comparative Example 2

A substrate (lens) having a diameter of 75φ, a central thickness of 2 mm, and a radius of curvature of 88 mm was prepared according to a known method in the same procedure as in Example 1, except that the material was changed to the lens material 2.

A functional layer with an adhesive layer was obtained in the same manner as in Example 1, except that a commercially available acrylic pressure-sensitive adhesive layer having a thickness of 25 microns (manufactured by NITTO DENKO CORPORATION.) (tackiness: 28.9°, storage modulus: 0.03 MPa) was used as the adhesive layer AD2-1 and laminated at room temperature. Then, while being stretched, the functional layer with an adhesive layer was bonded to the substrate of the lens material 2, thereby obtaining a lens with a functional layer.

Because the pressure-sensitive adhesive layer does not need to be heat-cured, annealing was performed at 120° C. for 2 hours. As a result, substantially all of the peripheral portion was peeled off except for a central portion having a diameter of about 3 cm.

The evaluation results are shown in Table 1.

Comparative Example 3

A substrate (lens) having a diameter of 75φ, a central thickness of 2 mm, and a radius of curvature of 88 mm was prepared according to a known method in the same procedure as in Example 1, except that the material was changed to the lens material 2.

As the curable adhesive layer AD2, an epoxy-based liquid adhesive GA-R-1/GA-H-1 (manufactured by Canon Inc.) for optical components was used (this adhesive has a storage modulus of 5 GPa after curing; in a state where the adhesive is not cured, tackiness cannot be evaluated by the method described above because 32 g of the steel ball sinks in the liquid adhesive; furthermore, in a case where the functional layer on which the liquid adhesive is disposed is made parallel to the vertical direction at 25° C., the liquid adhesive flows, and at least a part of the adhesive layer is detached from the functional layer). In addition, the functional layer used in Example 1 was just bent, bonded to a substrate so that the functional layer was loaded on the substrate, and cured at 80° C. for 3 hours, thereby obtaining a lens with a functional layer.

The lens with a functional layer was subjected to an edging process using an edger (edging machine) (LEX-1000) manufactured by NIDEK CO., LTD. in a dry mode so as to form a lens having a width of 40 mm and a height of 28 mm.

As a result, peeling occurred between the functional layer and the substrate, and unprocessed residues were observed.

The evaluation results are shown in Table 1. In Table 1 and Table 2 which will be described later, "Sheet-like adhesive" means a sheet-like adhesive that does not readily flow and is not separated from a functional layer or a substrate by the liquidization of components of the sheet-like adhesive, even though the sheet-like adhesive disposed on the functional layer or the substrate is made parallel to the vertical direction at 25° C. before being cured and kept as it is for about 20 minutes.

TABLE 1

| | | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|---|
| composition | Protective layer | Brand name | N/A | N/A | N/A | N/A | N/A | N/A | N/A | N/A | N/A | N/A |
| | Functional layer | Brand name | PET polarizing PET | PET polarizing PET | PET polarizing PET | Polyimide | PVA polarizing TAC/PVA/TAC | PET polarizing PC/PVA/PC | PET polarizing PET | PET polarizing PET | PET polarizing PET | PET polarizing PET |
| | | Material Thickness (μm) | 110-140 | 110-140 | 110-140 | Polyimide 50 | 200 (PVA layer 100 μm) | 700 (PVA layer 60 μm) | 110-140 | 110-140 | 110-140 | 110-140 |
| | Adhesive layer (AD2-1) (after curing) | Brand name | NIKAFLEX (R) SAFS manufactured by NIKKAN INDUSTRIES Co., Ltd. | | | | | | SAFN | FUJIMORI KOGYO CO., LTD. MASTACK | NITTO DENKO CORPORATION. OCA | Canon Inc. GA-R-1/ GA-H-1 |
| | | Type | Sheet-like adhesive | Sheet-like adhesive | Sheet-like adhesive | Sheet-like adhesive | Sheet-like adhesive | Sheet-like adhesive | Sheet-like adhesive | Sheet-like pressure-sensitive adhesive | Sheet-like pressure-sensitive adhesive | Liquid adhesive |
| | | Material | Polyester-based thermosetting material | Polyester-based thermosetting material | Polyester-based thermosetting material | Polyester-based thermosetting material | Polyester-based thermosetting material | Polyester-based thermosetting material | Urethane-based thermosetting material | Acryl OCA | Acryl OCA | Epoxy-based thermosetting material |
| | | Thickness (μm) | 25 | 25 | 25 | 25 | 25 | 25 | 8 | 100 | 25 | 100 |
| | | Storage modulus (MPa) | 400 | 400 | 400 | 400 | 400 | 400 | 400 | 0.03 | 0.03 | 5000 |
| | | Parallel light transmittance (%) | 90.1 | 90.1 | 90.1 | 90.1 | 90.1 | 90.1 | 88 | 89 | 90 | 94 |
| Testing with micro hardness tester | Testing force (mN) | | 0.1 | 0.1 | 0.1 | 0.1 | 0.1 | 0.1 | 0.1 | Unmeasurable * | | 0.1 |
| | Maximum indentation amount (μm) | | 0.38 | 0.38 | 0.38 | 0.38 | 0.38 | 0.38 | 0.56 | | | 0.09 |
| | Plastic deformation amount (μm) | | 0.34 | 0.34 | 0.34 | 0.34 | 0.34 | 0.34 | 0.49 | | | 0.05 |
| | Elastic deformation amount (μm) | | 0.04 | 0.04 | 0.04 | 0.04 | 0.04 | 0.04 | 0.08 | | | 0.04 |
| | Plastic deformation amount/Elastic deformation amount | | 8.5 | 8.5 | 8.5 | 8.5 | 8.5 | 8.5 | 6.13 | | | 1.25 |
| | DHT115-1 | | 2 | 2 | 2 | 2 | 2 | 2 | 1 | | | 53 |
| | DHT115-2 | | 3 | 3 | 3 | 3 | 3 | 3 | 1 | | | 283 |
| | $E^{+8}$ elastic modulus (Pa) | | 6.1 | 6.1 | 6.1 | 6.1 | 6.1 | 6.1 | 3.6 | | | 78 |

TABLE 1-continued

|  | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Lens facing eye | Material | Lens material 1 | RAV 7AT | Lens material 3 | Lens material 2 | Lens material 2 | Lens material 2 | Lens material 2 | Lens material 2 | Lens material 7 | Lens material 2 |
|  | Thickness | 15 mm | 2 mm | 2 mm | 2 mm | 2 mm | 2 mm | 2 mm | 2 mm | 2 mm | 2 mm |
|  | Refractive index | 1.67 | 1.498 | 1.74 | 1.60 | 1.60 | 1.60 | 1.60 | 1.60 | 1.60 | 1.60 |
| Adhesion of outer peripheral edge of high curvature lens (6 C or higher, during bonding) | | A | A | A | A | A | A | A | C Outer periphery peeling | C Outer periphery peeling | C Outer periphery peeling |
| Adhesion of outer peripheral edge of lens (during annealing) | | A | A | A | A | A | A | A | C Outer periphery peeling | C Outer periphery peeling | C Outer periphery peeling |
| Chuck mark during processing (none = A) | | A | A | A | A | A | A | A | C | C | A |

Example 8

In the same manner as in Example 1, a functional layer with the curable adhesive layer AD2 was prepared. Furthermore, the back surface of the functional layer opposite to the surface provided with AD2 was bonded to or coated with an adhesive for a thermosetting sheet (NIKAFLEX® SAFS manufactured by NIKKAN INDUSTRIES Co., Ltd.), thereby preparing a functional layer with adhesive layers including the curable adhesive layer AD1, a functional layer, and the adhesive layer AD2 in this order.

The functional layer was bonded to a substrate (lens) in the same manner as in Example 1 and cured at 90° C. for 2 hours, thereby preparing a lens with a functional layer. In addition, on the surface of the adhesive layer AD1-1 prepared by curing, a protective layer was formed by the following method. An epoxy acrylic hardcoat agent (2 g, manufactured by Daicel Corporation, 163) was put in a concave surface of a glass mold in which the concave surface conforms to the curve of the convex surface of the lens with a functional layer, the lens with a functional layer was placed and pressed on the mold, and then the mold was inverted. The hardcoat agent was cured by being irradiated with UV at an irradiation intensity of 1,000 mJ/cm$^2$, and the glass mold was released, thereby preparing a lens with a functional layer in which a protective layer having a thickness of 0.3 mm was formed on the adhesive layer AD1-1.

In this way, a lens (laminate) with a functional layer with a protective layer was obtained which included a protective layer, the adhesive layer AD1-1, a functional layer, the adhesive layer AD2-1, and a substrate in this order.

The laminate was annealed at 120° C. for 2 hours in the same manner as in Example 1. As a result, peeling of the outer periphery and the like were not observed.

In the same manner as in Example 1, the outer periphery of the laminate was processed using a curve generator. As a result, the laminate was excellently processed substantially without leaving unprocessed residues.

In the same manner as in Example 1, the laminate was subjected to an edging process in a dry mode. As a result, the laminate was excellently processed without causing peeling between the protective layer and the functional layer and without leaving unprocessed residues of the functional layer.

Example 9

A functional layer with adhesive layers including the curable adhesive layer AD1, a functional layer, and the curable adhesive layer AD2 in this order was prepared in the same manner as in Example 7. As the substrate (lens), a polycarbonate substrate (lens) having a diameter of 75φ, a central thickness of 2 mm, and a radius of curvature of 88 mm was prepared by drying pellet-like polycarbonate and then injection-molding the polycarbonate by a known method.

While being stretched, the functional layer was bonded to the polycarbonate substrate (lens) in the same manner as in Example 1 and cured at 90° C. for 2 hours, thereby preparing a lens with a functional layer. Furthermore, the surface of the adhesive layer AD1-1 prepared by curing was coated with an epoxy acrylic hardcoat agent (manufactured by Daicel Corporation, 163) by a spin coating method at a rotation frequency of 800 rpm, and the hardcoat agent was cured by being irradiated with UV at an irradiation intensity of 1,000 mJ/cm$^2$, thereby preparing a protective layer having a thickness of 0.1 mm. In this way, a lens (laminate) with a functional layer with a protective layer was obtained which included a protective layer, the adhesive layer AD1-1, a functional layer, the adhesive layer AD2-1, and a substrate (lens) in this order.

Subsequently, the laminate was subjected to an edging process using an edger (edging machine) (LEX-1000) manufactured by NIDEK CO., LTD. in a dry mode so as to form a lens having a width of 49 mm and a height of 28 mm, and the adhesiveness between the functional layer and the lens (substrate) and the like were evaluated.

The lens was excellent in which no peeling occurred between the protective layer and the functional layer and between the functional layer and the substrate and the functional layer did not leave unprocessed residues.

Example 10

A substrate was prepared in the same manner as in Example 1. Furthermore, in the same manner as in Example 7, a functional layer with adhesive layers was prepared which included the curable adhesive layer AD1, a functional layer, and the curable adhesive layer AD2 in this order. While being stretched, the functional layer was bonded to the substrate, and cured at 90° C. for 2 hours, thereby preparing a substrate (lens) with a functional layer with the adhesive layer AD1-1.

On the surface of the adhesive layer AD1-1 prepared by curing, a protective layer was formed by the following method. Urethane acrylate (2 g, manufactured by DIC Corporation, V-4001EA) was put in a concave surface of a glass mold in which the concave surface conforms to the curve of the convex surface of the lens with a functional layer, the lens with a functional layer was placed and pressed on the mold, and then the mold was inverted. The urethane acrylate was cured by being irradiated with UV at an irradiation intensity of 1,000 mJ/cm$^2$, and the glass mold was released, thereby preparing a lens (laminate) with a functional layer with a protective layer in which a protective layer having a thickness of 0.5 mm was formed on the adhesive layer AD1-1.

The laminate was annealed at 120° C. for 2 hours in the same manner as in Example 1. As a result, peeling of the outer periphery and the like were not observed.

In the same manner as in Example 1, the outer periphery of the laminate was processed using a curve generator. As a result, the laminate was excellently processed substantially without leaving unprocessed residues.

In the same manner as in Example 1, the laminate was subjected to an edging process in a dry mode. As a result, the laminate was excellently processed without causing peeling between the protective layer and the functional layer and without leaving unprocessed residues of the functional layer.

Example 11

A substrate (lens) having a diameter of 75φ, a central thickness of 2 mm, and a radius of curvature of 88 mm was prepared according to a known method in the same procedure as in Example 1, except that the material was changed to the lens material 2.

Furthermore, in the same manner as in Example 7, a functional layer with adhesive layers was prepared which included the curable adhesive layer AD1, a functional layer, and the curable adhesive layer AD2 in this order. While being stretched, the functional layer was bonded to the substrate and cured at 90° C. for 2 hours, thereby preparing a lens with a functional layer with the adhesive layer AD1-1.

On the surface of the adhesive layer AD1-1 in the lens with a functional layer with the adhesive layer AD1-1, a protective layer was formed by the following method. A spacer having a thickness of 0.5 mm was placed on the outer periphery of a concave surface of a glass mold in which the concave surface conforms to the curve of the convex surface of the lens with a functional layer, and 4 g of the lens material 2 was put into the concave surface of the glass mold. The lens with a functional layer was placed on the mold, the mold was slowly heated up to 115° C. from 30° C. for 12 hours in the same manner as in Example 1 so that the lens material 2 was cured, and the glass mold was released, thereby preparing a lens (laminate) with a functional layer with a protective layer in which a protective layer having a thickness of 0.3 mm was formed on the adhesive layer AD1-1.

After curing, peeling or displacement of the functional layer was not particularly observed. In addition, no peeling or displacement was observed even after annealing at 120° C. for 2 hours.

Subsequently, the laminate was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

Example 12

In Example 11, ASSIST 7M (urethane elastomer-based thermosetting resin) of Sotec co., Ltd. was used as the curable adhesive layer AD1 instead of SAFS of NIKKAN INDUSTRIES Co., Ltd., and the curable adhesive layer AD2 was changed to SAFN (urethane-based resin) of NIKKAN INDUSTRIES Co., Ltd. Then, a lens with a protective layer was prepared as below.

While being heated and bent in the same manner as in other examples, a functional layer with the curable adhesive layer AD2 (functional layer with SAFN from NIKKAN INDUSTRIES Co., Ltd. having a thickness of 8 μm laminated on one surface of the functional layer) was bonded to a lens substrate so that the side of AD2 came into contact with the convex surface of the substrate. The AD2 layer was heat-cured in the same manner as in other examples. Then, ASSIST 7M was diluted with toluene to prepare a 6 wt % solution, the surface of the functional layer was coated with the solution at a thickness of 10 μm by a spin coating method and dried, and the solution was cured at 90° C. for 120 minutes, thereby preparing a lens with a functional layer with the adhesive layer AD1-1 which included the adhesive layer AD1-1, a functional layer, the adhesive layer AD2-1, and a lens substrate laminated in this order.

On the surface of the adhesive layer AD1-1 of the lens with a functional layer with the adhesive layer AD1-1, a protective layer made of the lens material 2 was formed by the following method as in Example 11. A spacer having a thickness of 0.5 mm was placed on the outer periphery of a concave surface of a glass mold in which the concave surface conforms to the curve of the convex surface of the lens with a functional layer, and 4 g of the lens material 2 was put into the concave surface of the glass mold. The lens with a functional layer was placed on the mold, the mold was slowly heated up to 115° C. from 30° C. for 12 hours in the same manner as in Example 1 so that the lens material 2 was cured, and the glass mold was released, thereby preparing a lens (laminate) with a functional layer in which a protective layer having a thickness of 0.3 mm was formed on the adhesive layer AD1-1.

After curing, peeling or displacement of the functional layer was not particularly observed. In addition, no peeling or displacement was observed even after annealing at 120° C. for 2 hours.

Subsequently, the lens with a functional layer was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

Example 13

As the adhesive layer AD1 in Example 11, instead of SAFS of NIKKAN INDUSTRIES Co., Ltd., ASSIST 7M (urethane elastomer-based thermosetting resin) of Sotec co., Ltd. was used. Furthermore, a lens substrate with a protective layer was prepared as below.

While being heated and bent in the same manner as in other examples, a functional layer with the curable adhesive layer AD2 (functional layer with NIKKAFLEX SAFS of NIKKAN INDUSTRIES Co., Ltd. having a thickness of 25 μm laminated on one surface of the functional layer) was bonded to a lens substrate so that the side of AD2 came into contact with the convex surface of the lens substrate. The AD2 layer was heat-cured in the same manner as in other examples, coated with ASSIST 7M diluted with toluene to prepare a 6 wt % solution at a thickness of 10 μm by a spin coating method, dried, and cured at 90° C. for 120 minutes, thereby preparing a lens with a functional layer with the adhesive layer AD1-1 which included the adhesive layer AD1-1 (layer obtained by curing the adhesive layer AD1), a functional layer, the adhesive layer AD2-1, and a lens substrate laminated in this order.

On the surface of the adhesive layer AD1-1 of the lens with a functional layer with the adhesive layer AD1-1, a protective layer made of the lens material 2 was formed by the following method as in Example 11. A spacer having a thickness of 0.5 mm was placed on the outer periphery of a concave surface of a glass mold in which the concave surface conforms to the curve of the convex surface of the lens with a functional layer, and 4 g of the lens material 2 was put into the concave surface of the glass mold. The lens with a functional layer was placed on the mold, the mold was slowly heated up to 115° C. from 30° C. for 12 hours in the same manner as in Example 1 so that the lens material 2 was cured, and the glass mold was released, thereby preparing a lens (laminate) with a functional layer in which a protective layer having a thickness of 0.3 mm was formed on the adhesive layer AD1-1.

After curing, peeling or displacement of the functional layer was not particularly observed. In addition, no peeling or displacement was observed even after annealing at 120° C. for 2 hours.

Subsequently, the laminate was subjected to an edging process using an edger (edging machine) (LEX-1000) manufactured by NIDEK CO., LTD. in a dry mode so as to form a lens having a width of 49 mm and a height of 28 mm. As a result, the lens was excellent in which no peeling occurred between the protective layer and the functional layer and between the functional layer and the substrate and the functional layer did not leave unprocessed residues.

Comparative Example 4

The lens (laminate) with a functional layer on which a protective layer was formed was prepared in the same manner as in Example 11, except that the lens material 2 in Example 11 was changed to BEAMSET 575B manufactured by Arakawa Chemical Industries, Ltd., the functional layer was coated with BEAMSET 575B by a spin coating method, and BEAMSET 575B was cured by being irradiated with UV at a cumulative intensity of 1,000 mJ/cm$^2$ so as to form a protective layer having a thickness of 0.3 mm.

The cured protective layer had several cracks.

The laminate was subjected to an edging process using an edger (edging machine) (LEX-1000) manufactured by NIDEK CO., LTD. so as to form a lens having a width of 49 mm and a height of 28 mm. As a result, chipping occurred at the outer periphery of the protective layer, and peeling and scraping residues of the functional layer also occurred.

Comparative Example 5

The lens (laminate) with a functional layer on which a protective layer was formed was prepared in the same manner as in Example 12, except that the lens material 2 in Example 12 was changed to 3121D of ThreeBond Holdings Co., Ltd., the functional layer was coated with 3121D by a spin coating method, and 3121D was cured by being irradiated with UV at a cumulative intensity of 3,000 mJ/cm$^2$ so as to form a protective layer having a thickness of 0.3 mm.

The cured protective layer had several cracks.

The laminate was subjected to an edging process using an edger (edging machine) (LEX-1000) manufactured by NIDEK CO., LTD. in a dry mode at a width of 49 mm and a height of 28 mm. As a result, scraping residues of the protective layer and the functional layer were scattered to the outer peripheral convex side of the lens, and peeling occurred.

Comparative Example 6

The lens (laminate) with a functional layer on which a protective layer was formed was prepared in the same manner as in Example 12, except that the lens material 2 in Example 12 was changed to 3043B of ThreeBond Holdings Co., Ltd., the functional layer was coated with 3043B by a spin coating method, and 3043B was cured by being irradiated with UV at a cumulative intensity of 3,000 mJ/cm$^2$ so as to form a protective layer having a thickness of 0.3 mm.

The cured protective layer had several cracks.

The laminate was subjected to an edging process using an edger (edging machine) (LEX-1000) manufactured by NIDEK CO., LTD. so as to form a lens having a width of 49 mm and a height of 28 mm. As a result, scraping residues of the protective layer and the functional layer were scattered to the outer peripheral convex side of the lens, and peeling occurred.

TABLE 2

| Composition | | | Example 8 | Example 9 | Example 10 | Example 11 | Example 12 | Example 13 | Comparative Example 4 | Comparative Example 5 | Comparative Example 6 |
|---|---|---|---|---|---|---|---|---|---|---|---|
| Protective layer | | Brand name | 163 from DAICEL Corporation | 163 from DAICEL Corporation | V-4001EA from DIC Corporation | Lens material 2 | Lens material 2 | Lens material 2 | BEAMSET 575CB from Arakawa Chemical Industries, Ltd. | ThreeBond Holdings Co., Ltd. | 3043B from ThreeBond Holdings Co., Ltd. |
| | | Material | Epoxy acrylic material | Epoxy acrylic material | Urethane acrylate-based material | Thiourethane | Thiourethane | Thiourethane | Acryl | Acryl | Acryl |
| | | Thickness (μm) | 300 | 100 | 500 | 300 | 300 | 300 | 300 | 300 | 300 |
| | | Physical properties (pencil hardness) | 6H | 6H | 2H | 2H | 2H | 2H | 9H | B | B |
| | | Physical properties (flexibility) | 10 mmφ | 10 mmφ | 4 mmφ | 4 mmφ | 4 mmφ | 4 mmφ | 50 mmφ | 4 mmφ | 4 mmφ |
| | | Physical properties (Young's modulus) | 4 GPa | 4 GPa | 1.3 GPa | 2 GPa | 2 GPa | 2 GPa | 4 GPa | 0.4 GPa | 0.4 GPa |
| | Testing with micro hardness tester | Testing force (mN) | 0.1 | 0.1 | 0.11 | 0.1 | 0.1 | 0.1 | 0.11 | 0.1 | 0.11 |
| | | Maximum indentation amount (μm) | 0.06 | 0.06 | 0.06 | 0.06 | 0.06 | 0.06 | 0.05 | 0.08 | 0.08 |
| | | Plastic deformation amount (μm) | 0.03 | 0.03 | 0.03 | 0.03 | 0.03 | 0.03 | 0.02 | 0.04 | 0.05 |
| | | Elastic deformation amount (μm) | 0.03 | 0.03 | 0.03 | 0.03 | 0.03 | 0.03 | 0.04 | 0.04 | 0.03 |
| | | Plastic deformation amount/Elastic deformation amount | 1 | 1 | 1 | 1 | 1 | 1 | 0.5 | 1 | 1.7 |
| | | DHT115-1 | 0 | 0 | 126 | 126 | 126 | 126 | 157 | 63 | 65 |
| | | DHT115-2 | 538 | 538 | 730 | 730 | 730 | 730 | 3306 | 361 | 163 |
| | | Et+8 elastic modulus (Pa) | 160 | 160 | 160 | 310 | 310 | 310 | 220 | 93 | 93 |
| Adhesive layer (AD1-1) (after curing) | | Brand name | NIKAFLEX (R) SAFS manufactured by NIKKAN INDUSTRIES Co., Ltd. | NIKAFLEX (R) SAFS manufactured by NIKKAN INDUSTRIES Co., Ltd. | NIKAFLEX (R) SAFS manufactured by NIKKAN INDUSTRIES Co., Ltd. | NIKAFLEX (R) SAFS manufactured by NIKKAN INDUSTRIES Co., Ltd. | ASSIST 7M manufactured by Sotec co., Ltd. | ASSIST 7M manufactured by Sotec co., Ltd. | NIKAFLEX (R) SAFS manufactured by NIKKAN INDUSTRIES Co., Ltd. | NIKAFLEX (R) SAFS manufactured by NIKKAN INDUSTRIES Co., Ltd. | NIKAFLEX (R) SAFS manufactured by NIKKAN INDUSTRIES Co., Ltd. |
| | | Material | Polyester-based material | Polyester-based material | Polyester-based material | Polyester-based material | Urethane-based elastomer | Urethane-based elastomer | Polyester-based material | Polyester-based material | Polyester-based material |
| | | Thickness (μm) | 8 | 8 | 8 | 8 | 8 | 8 | 8 | 8 | 8 |
| | | Storage modulus (MPa) | 400 | 400 | 400 | 400 | 400 | 400 | 400 | 400 | 400 |
| | | Parallel light transmittance | 90.1 | 90.1 | 90.1 | 90.1 | 90.1 | 90.1 | 90.1 | 90.1 | 90.1 |

TABLE 2-continued

| | | | Example 8 | Example 9 | Example 10 | Example 11 | Example 12 | Example 13 | Comparative Example 4 | Comparative Example 5 | Comparative Example 6 |
|---|---|---|---|---|---|---|---|---|---|---|---|
| | Testing with micro hardness tester | Testing force (mN) | 0.1 | 0.1 | 0.1 | 0.1 | 0.1 | 0.1 | 0.1 | 0.1 | 0.1 |
| | | Maximum indentation amount (μm) | 0.51 | 0.51 | 0.51 | 0.51 | 0.09 | 0.09 | 0.51 | 0.51 | 0.51 |
| | | Plastic deformation amount (μm) | 0.48 | 0.48 | 0.48 | 0.48 | 0.03 | 0.03 | 0.48 | 0.48 | 0.48 |
| | | Elastic deformation amount (μm) | 0.02 | 0.02 | 0.02 | 0.02 | 0.06 | 0.06 | 0.02 | 0.02 | 0.02 |
| | | Plastic deformation amount/Elastic deformation amount | 24 | 24 | 24 | 24 | 0.5 | 0.5 | 24 | 24 | 24 |
| | | DHT115-1 | 1 | 1 | 1 | 1 | 56 | 56 | 1 | 1 | 1 |
| | | DHT115-2 | 1 | 1 | 1 | 1 | 908 | 908 | 1 | 1 | 1 |
| | | $Er^{+8}$ elastic modulus (Pa) | 3.1 | 3.1 | 3.1 | 3.1 | 83 | 83 | 3.1 | 3.1 | 3.1 |
| Functional layer | Brand name | | PET polarizing PET | PET polarizing PET | PET polarizing PET | PET polarizing PET | PET polarizing PET | PET polarizing PET | PET polarizing PET | PET polarizing PET | PET polarizing PET |
| | Material | | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) | SAFS (NIKKAN INDUSTRIES Co., Ltd.) |
| | Thickness (μm) | | 110-140 | 110-140 | 110-140 | 110-140 | 110-140 | 110-140 | 110-140 | 110-140 | 110-140 |
| Adhesive layer (AD2-1) (after curing) | Brand name | | | | | | | | | | |
| | Type | | Sheet-like adhesive | Sheet-like adhesive | Sheet-like adhesive | Sheet-like adhesive | Sheet-type adhesive | Sheet-like adhesive | Sheet-like adhesive | Sheet-like adhesive | Sheet-like adhesive |
| | Material | | Polyester-based thermosetting material | Polyester-based thermosetting material | Polyester-based thermosetting material | Polyester-based thermosetting material | Urethane-based thermosetting material | Polyester-based thermosetting material | Polyester-based thermosetting material | Polyester-based thermosetting material | Polyester-based thermosetting material |
| | Thickness (μm) | | 25 | 25 | 25 | 25 | 8 | 25 | 25 | 25 | 25 |
| | Storage modulus (MPa) | | 400 | 400 | 400 | 400 | 400 | 400 | 400 | 400 | 400 |
| | Parallel light transmittance | | 90.1 | 90.1 | 90.1 | 90.1 | 88 | 90.1 | 90.1 | 90.1 | 90.1 |
| Lens facing eye | Material | | Lens material 1 | Polycarbonate | Lens material 1 | Lens material 2 | Lens material 2 | Lens material 2 | Lens material 2 | Lens material 2 | Lens material 2 |
| | Thickness | | 15 mm | 2 mm | 15 mm | 2 mm | 2 mm | 2 mm | 2 mm | 2 mm | 2 mm |
| | Refractive index | | 1.67 | 1.58 | 1.67 | 1.6 | 1.6 | 1.6 | 1.6 | 1.6 | 1.6 |
| Evaluation | Unprocessed residues | | A | B | AA to A | AA | AA | AA | C Chipping | C Scattering | C Scattering |
| | Adhesion of outer peripheral edge of high curvature lens (6 C or higher, during bonding) | | A | | A | A | A | A | A | A | A |

TABLE 2-continued

| | Example 8 | Example 9 | Example 10 | Example 11 | Example 12 | Example 13 | Comparative Example 4 | Comparative Example 5 | Comparative Example 6 |
|---|---|---|---|---|---|---|---|---|---|
| Adhesion of outer peripheral edge of lens (during annealing) | A | A | A | A | A | A | A | A | A |
| Chuck mark during processing (none = A) | A | 110000000A | A | A | A | A | A | A | A |

The present application claims priority based on Japanese Patent Application No. 2018-180714 filed on Sep. 26, 2018, the entire content of which is incorporated into the present specification.

The invention claimed is:

1. A functional layer with an adhesive layer, comprising:
a functional layer; and
a curable adhesive layer AD2 arranged over at least a part of a surface of the functional layer,
wherein the curable adhesive layer AD2 contains an ester-based resin and a curing accelerator,
wherein the curable adhesive layer AD2 satisfies both the following requirements (1) and (2),
(1) in a case where 32 g of a steel ball is placed on an adhesive surface of the curable adhesive layer AD2 which is formed on a glass plate at 25° C. and kept as it is for 10 seconds, and then the glass plate is slowly tilted, the steel ball starts to roll at an angle of 5° or less,
(2) after being cured at 90° C. for 2 hours, the curable adhesive layer AD2 satisfies a ratio (b/a) of a plastic deformation amount b to an elastic deformation amount a of 1 to 100 at 25° C. under a load of 0.1 mN.

2. The functional layer with an adhesive layer according to claim 1,
wherein the curable adhesive layer AD2 satisfies the following requirement (3),
(3) after being cured at 90° C. for 2 hours, the curable adhesive layer AD2 has a dynamic hardness (DHT115-2) of 0.01 to 5,000 after removing the load of 0.1 mN at 25° C.

3. The functional layer with an adhesive layer according to claim 1,
wherein the curable adhesive layer AD2 satisfies the following requirement (4),
(4) after being cured at 90° C. for 2 hours, the curable adhesive layer AD2 has a storage modulus of 0.5 MPa or higher and 1,000 MPa or lower at 25° C.

4. The functional layer with an adhesive layer according to claim 1,
wherein the plastic deformation amount b is greater than 0 and 1 or less.

5. The functional layer with an adhesive layer according to claim 1,
wherein the functional layer includes a polymer layer having a glass transition temperature and a softening point temperature of 0° C. or higher and a thickness in a range of 1 μm to 1 mm.

6. The functional layer with an adhesive layer according to claim 1,
wherein the curable adhesive layer AD2 has a thickness less than 100 μm.

7. The functional layer with an adhesive layer according to claim 1,
wherein the curable adhesive layer AD2 further satisfies the following requirement,
(5) after being cured, the curable adhesive layer AD2 has a refractive index (JIS K7142) of 1.45 or higher.

8. The functional layer with an adhesive layer according to claim 5,
wherein the polymer layer is substantially a uniaxially stretched film.

9. The functional layer with an adhesive layer according to claim 8,
wherein the polymer layer is a polarizing film containing polyethylene terephthalate.

10. A substrate with a functional layer prepared by laminating the curable adhesive layer AD2 of the functional layer according to claim 1 on one surface of a substrate, comprising, in the following order:
the functional layer;
an adhesive layer AD2-1 obtained by curing the curable adhesive layer AD2; and
the substrate;
wherein the curable adhesive layer AD2 contains an ester-based resin and a curing accelerator,
wherein the adhesive layer AD2-1 is disposed in at least a part of a space between a surface of the functional layer and a surface of the substrate that face each other and satisfies the following requirement (i),
(i) a ratio (b/a) of a plastic deformation amount b to an elastic deformation amount a is 1 to 100 at 25° C. under a load of 0.1 mN.

11. The substrate with a functional layer according to claim 10,
wherein the adhesive layer AD2-1 satisfies the following requirement (ii),
(ii) a dynamic hardness (DHT115-2) is 0.01 to 5,000 after removing a load of 0.1 mN at 25° C.

12. The substrate with a functional layer according to claim 10,
wherein the adhesive layer AD2-1 satisfies the following requirement (iii),
(iii) a storage modulus is 0.5 MPa or higher and 1,000 MPa or lower at 25° C.

13. A laminate obtained by forming a protective layer on the functional layer of the substrate with the functional layer according to claim 12, comprising, in the following order:
the protective layer;
the functional layer;
the adhesive layer AD2-1; and
the substrate;
wherein the adhesive layer AD2-1 is disposed at least in a part of a space between a surface of the functional layer and a surface of the substrate that face each other,
the protective layer satisfies all the following requirements (a), (b), and (c), and
the adhesive layer AD2-1 satisfies the following requirement (i),
(a) a thickness is 10 μm to 1 mm,
(b) a ratio (b/a) of a plastic deformation amount b to an elastic deformation amount a is 0.1 to 10 at 25° C. under a load of 0.1 mN,
(c) a dynamic hardness (DHT115-2) is 400 to 3,000 after removing a load of 0.1 mN at 25° C.,
(i) a storage modulus is 0.5 MPa or higher and 1,000 MPa or lower at 25° C.

14. The laminate according to claim 13,
wherein the protective layer satisfies the following requirement (d),
(d) a pencil hardness is HB to 9H.

15. The laminate according to claim 13, further comprising:
an adhesive layer AD1-1 between the protective layer and the functional layer,
wherein the adhesive layer AD1-1 satisfies the following requirement (i),
(i) a ratio (b/a) of a plastic deformation amount b to an elastic deformation amount a is 0.01 to 100 at 25° C. under a load of 0.1 mN.

16. The laminate according to claim 15,
wherein the adhesive layer AD1-1 satisfies the following requirement (ii), (ii) a dynamic hardness (DHT115-2) after removing the load of 0.1 mN at 25° C. is 0.01 to 5,000.

17. The laminate according to claim 15, wherein the adhesive layer AD1-1 satisfies the following requirement (iii),
(iii) a storage modulus is 0.5 MPa or higher and 1,000 MPa or lower at 25° C.

18. An optical component comprising:
the substrate with a functional layer according to claim 12,
wherein the substrate is a lens having a refractive index of 1.49 or higher.

19. The optical component according to claim 18, wherein the adhesive layer AD2-1 is in contact with at least a part of a surface of the lens.

20. The optical component according to claim 18, wherein the optical component is a polarizing lens in which the functional layer has a polarizing property.

* * * * *